United States Patent
Ono

(10) Patent No.: US 6,578,112 B2
(45) Date of Patent: Jun. 10, 2003

(54) CACHE MEMORY CONTROL DEVICE FOR MULTI-PROCESSOR SYSTEM

(75) Inventor: Mitsuhiro Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

(21) Appl. No.: 09/864,328

(22) Filed: May 25, 2001

(65) Prior Publication Data

US 2001/0049769 A1 Dec. 6, 2001

(30) Foreign Application Priority Data

May 30, 2000 (JP) ....................................... 2000-160529

(51) Int. Cl.[7] .............................................. G06F 12/00
(52) U.S. Cl. ......................... 711/137; 711/118; 710/56
(58) Field of Search ................................. 711/118, 137, 711/160; 710/56; 365/189.05

(56) References Cited

U.S. PATENT DOCUMENTS 5,490,113 A * 2/1996 Tatosian et al. ....... 365/189.05
5,951,658 A * 9/1999 Daray, Jr. et al. ............. 710/56
6,085,291 A * 7/2000 Hicks et al. ................. 711/137
6,219,759 B1   4/2001 Kumakiri .................... 711/137
6,317,811 B1 * 11/2001 Deshpande et al. ......... 711/137

FOREIGN PATENT DOCUMENTS

JP    11-143775    5/1999

* cited by examiner

Primary Examiner—Do Hyun Yoo
Assistant Examiner—Nasser Moazzami
(74) Attorney, Agent, or Firm—Foley & Lardner

(57) ABSTRACT

A cache memory control device enables an external instruction ROM to be co-owned by plural processors while minimizing the lowering of the processing performance of the processor and curtailing the number of external terminals of the LSIs. In a multi-processor system having a processor, an instruction RAM bank and an instruction RAM controller for each physical layer PHY, there is provided one instruction ROM for storing instruction data. The RAM controller of each PHY outputs time allowance information to a pre-fetch request of the instruction data. If there are simultaneously output pre-fetch requests from plural PHYs, the pre-fetch controller selects a pre-fetch request having the smallest time allowance.

28 Claims, 12 Drawing Sheets

FIG. 3

| Bits | Field |
|---|---|
| 0–7 | ROM ADDRESS (UPPER 8 BIT) (00H ~ FFH) |
| 8 | BUSY |
| 9–11 | BANK (BANK NO.) (0 ~ 7) |
| 12–19 | DEADLINE TIME (00H ~ FFH) |
| 20–31 | RESERVED |

CACHE MEMORY CONTROL DEVICE FOR MULTI-PROCESSOR SYSTEM

FIELD OF THE INVENTION

This invention relates to a cache memory control device and, more particularly, to a cache control system usable with advantage for command pre-fetch in a multi-processor system.

BACKGROUND OF THE INVENTION

FIG. 11 shows an exemplary structure of a conventional communication LSI and more specifically a structure of a single PHY (physical layer) LSI of ADSL (Asymmetrical Digital Subscriber Line) modem. This ADSL is a high-speed digital transmission system in which the speed from a subscriber accommodating station of a communication undertaker to user's premises (downstream) is asymmetrical with respect to that from the user's premises to the accommodating station (upstream) and which uses a pre-existing telephone cable. A signal processor 8 which is adapted for performing digital signal processing on a communication LSI 200C, a baseband unit 9 and an ATM (asynchronous transfer mode) TC (transmission convergence) 10 make up a communication system hardware. The signal processor 8 includes an interfacing circuit 6 made up of a driver receiver circuit of a line (line), a converting circuit 7, made up of a digital-analog converting circuit (D-A) 7-1 for digital-analog converting transmission signals, and an analog-digital converting circuit (A-D) 7-2 for analog-digital converting transmission signals. The communication LSI 200C also includes a processor (CPU) 2, a work RAM 3, an instruction RAM 5 made up of plural RAM banks (eight banks in FIG. 11) in which commands to be executed in the processor 2 are pre-fetched and stored, and an instruction RAM controller 1C. The processor 2 is connected over an internal bus 4 to the communication system hardware, such as work RAM 3, instruction RAM controller 1C and the signal processor 8 etc. The ATM TC (transmission convergence) 10 exchange data with e.g., an upper layer of the PHY (physical layer) supported by the communication LSI 200C.

An external instruction ROM (read-only memory) 12, having an instruction data queue (instructions (commands) and data for executing communication control in the processor 2) stored therein, is externally mounted to the LSI 200C. The instruction RAM controller IC (cache controller) pre-fetches instruction data from the external instruction ROM 12 for storage in a relevant bank in the instruction RAM 5.

The instruction RAM controller IC includes a command register 11C for pre-fetch, as a control register. Even if there is no cache error, the processor 2 writes a pre-fetch request command in the command register 11C at an arbitrary time point to update the instruction RAM 5.

In this command register 11C, start addresses of instruction data, pre-fetched from the instruction RAM 12, and bank numbers of the instruction RAM 5, in which to load the pre-fetched instruction data, are set, and instruction data read out from a relevant address are written in a relevant bank in the instruction RAM 5 in an amount corresponding to the bank memory capacity.

With the instruction RAM 5 being made up of plural banks, the contents of a given bank of a given one of the instruction RAMs 5 can be updated during the accessing of another bank to render queuing of cache updating processing unnecessary to improve the processing performance.

Meanwhile, as to a cache memory system in which the cache memory is made up of plural banks, a cache controller is provided with a command register, and a cache update command is set in the command register under a command from the processor to enable loading (pre-fetch) command to the cache memory at an arbitrary time even if there has occurred no cache error, reference may be had e.g., to the JP Patent Kokai JP-A-11-143775.

Since plural pre-fetch requests are not superposed in this configuration of the signal PHY type LSI 200C, there is provided no function for determining the priority sequence of the pre-fetch requests.

FIG. 12 shows the configuration of a multi-PHY type LSI 200D, in which plural single (sole line) PHY type LSI 200Cs, shown in FIG. 11, are used to allow to cope with plural lines.

Referring to FIG. 12, circuit blocks $100_1$ to $100_4$ are provided for each PHY. Each of the circuit blocks $100_1$ to $100_4$ includes communication hardware comprised of a CPU 2, an instruction RAM controller 1C, an instruction RAM 5, a signal processor 8 and a baseband processor 9.

Referring to FIG. 12, since no measures are taken to enable the co-owning of the external instruction ROM, four external instructions ROMs 12 are each externally connected to each of PHYs of the LSI 200Ds adapted to cope with four lines. The LSI 200 is in need of a number of terminals corresponding to the number of terminals of these four instructions ROMs. For example, if an address signal is of a 20-bit width and the data is of 8-bit width, 112 terminals are required in order to cope with four instruction ROMs. The number of the terminals is increased further if control signals such as chip enable signals etc. are taken into consideration.

SUMMARY OF THE DISCLOSURE

The conventional multi-processor system for coping with plural lines, as described above, has a drawback that a number of external ROM interfaces corresponding to the number of lines (PHYs) to be supported, are required, thus increasing the number of the LSI external terminals by multi-physical layering, termed as "multi-PHYing" herein.

In particular, the program stored in the instruction ROM is increased in size, as the communication control is becoming complex and as control function is diversified, thus increasing the memory capacity of the instruction ROM. In keeping up therewith, the number of address signals of the instruction ROM is increased. Under this situation, the configuration shown in FIG. 12 leads directly to an increased number of LSI pins.

Moreover, since plural external instruction ROMs are required in association with the number of lines, it offers a poor cost reducing effect per line, too.

Also, high-speed processing is required in cache memory control and in pre-fetch control, such that deterioration in the control performance reflects itself readily in the processing performance of the processor. Thus, in case where, in the communication circuit in need of high-speed processing, a configuration is employed such that the instruction ROM is co-owned by the respective PHYs, measures for suppressing the lowering of the processing performance are necessitated.

It is therefore an object of the present invention to provide a cache memory control device in which an external instruction ROM, having stored therein program commands for loading in the cache memory, can be co-owned by plural processors, and in which the lowering of the pro performance of the processor can be suppressed to a minimum.

It is another object of the present invention to provide a cache memory control device in which the number of external terminals of the LSI having plural processors can be reduced. Other objects, features and advantages of the present invention will become apparent from the following description of preferred embodiments and the claims.

According to a first aspect of the present invention, there is provided a novel cache memory control device for a multi-processor system having a plurality of processors. The cache memory control device comprises a plurality of cache memories provided in association with a plurality of the processors, respectively; a memory device co-owned by a plurality of the cache memories having stored therein instruction data to be stored in each of the cache memories; and a plurality of command registers associated with the cache memories for controlling updating of the cache memories in association with respective ones of the plural cache memories. Each of the cache memories stores therein instruction data pre-read from the memory device, and the instruction data is used in the processor corresponding to each of the cache memories. Each of the processors associated with each of the cache memories writing cache memory updating request commands, including information on time allowance until updating of the cache memories, in the command register associated with the cache memories, so that a cache memory updating request is output to a pre-fetch controller. The pre-fetch controller includes means for selecting a cache memory updating request, based on the time allowance information of a plurality of updating requests for the plural cache memories, if such plural updating requests for the cache memories are output. The instruction data is read out from the memory device in accordance with the selected cache memory updating request to update the contents of the so-selected cache memory.

According to a second aspect of the present invention, there is provided a cache memory control device for a multi-processor system having a plurality of processors, comprising: a plurality of cache memories provided in association with a plurality of the processors, respectively; a memory device co-owned by a plurality of the cache memories having stored therein instruction data to be stored in each of the cache memories, and a plurality of command registers associated with the cache memories for controlling updating of the cache memories in association with respective ones of the plural cache memories. Each of the cache memories stores therein instruction data pre-read from the memory device, and the instruction data is used in each of the processors corresponding to each of the cache memories.

Each of the processors associated with each of the cache memories writes a cache memory updating request command, inclusive of a readout start address of the memory device, in the command register associated with each the cache memory, to output a cache memory updating request to a pre-fetch controller. The pre-fetch controller includes means for broadcast-transferring to the plural cache memories a readout start address of the memory device output along with the cache memory updating request and instruction data read out from the memory device. The contents of the cache memory are updated by the broadcast-transferred instruction data if the readout start address broadcast-transferred from the pre-fetch controller coincides with a readout address of the memory device updating an own cache memory. A plurality of the cache memories are enabled to be updated simultaneously responsive to updating requests of plural cache memories the readout addresses of the memory device of which coincide with one another.

In the present invention, the cache memory may be comprised of plural banks and plural command registers may be provided for each of the cache memories.

As will become clear from the following description, the above objects can also be accomplished by the features set forth in the respective claims, the entire disclosure of the appended claims being incorporated herein by reference thereto.

In the following, particular aspects of the present invention are mentioned.

According to a third aspect, a cache memory control device is provided in a multi-processor system adapted for a plurality of channels or lines, and including a processor, a cache memory and a cache memory controller for each channel or line, the cache memory control device comprising:

a sole common memory device common through the cache memories, for storage of instruction data executed by each processor, and means for exercising control so that, if pre-fetch requests are issued simultaneously from plural cache controllers, pre-fetch of the instruction data from the instruction memory device to the cache memory is performed beginning from a cache memory with the least time allowance, based on the information indicating the time allowance until a scheduled timing of actual use of the instruction data pre-fetched to the cache memory.

According to a fourth aspect, there is also provided a cache memory control device in a multi-processor system adapted for a plurality of channels or lines, and including a processor, a cache memory and a cache memory controller for each channel or line, the cache memory control device comprising:

a sole common memory device common through the cache memories, for storage of instruction data executed by each processor, and means for broadcasting instruction data pre-fetched from the memory device to a plurality of the cache memory controllers which issued pre-fetch requests when there are a plurality of pre-fetch requests having coincident pre-fetch start addresses of the memory device specified by the pre-fetch requests from the cache controllers.

According to a fifth aspect, there is provided a multi-processor system having a processor, a cache memory and a cache memory controller for each of physical layers of communication control, and adapted for a plurality of channels or lines, wherein an instruction memory device for storage of instruction data forming a program loaded in a cache memory of each processor of a plurality of the physical layers is co-owned by a plurality of the physical layers;

in a pre-fetch control device for pre-fetching instruction data from the instruction memory device, plural interfaces for controlling the accessing to the instruction memory device are collected into a sole interface;

in issuing a pre-fetch request of instruction data, the cache memory control device of each physical layer also outputting to the pre-fetch control device an information pertinent to the time allowance until the instruction data are needed by the cache memory associated with the cache memory control device;

the pre-fetch control device including means for selecting a pre-fetch request with a smaller one of the time allowance if pre-fetch requests are output simultaneously from the plural cache memory control devices.

According to a sixth aspect, there is provided a communication control device of a multi-processor configuration comprising, for each of a plurality of physical layers of communication control, a communication-based circuit, a processor for controlling the communication-based circuit, an instruction random access memory RAM for pre-fetching and storing instruction data fetched by the processor and an instruction RAM controller for controlling the instruction RAM, the communication control device comprising:

a common one instruction ROM for storing the instruction data for the plural physical layers; and one pre-fetch controller for the plural physical layers for controlling pre-fetch from the instruction ROM;

the instruction RAM controller of each physical layer outputting an information pertinent to time allowance for a pre-fetch request for the instruction data;

wherein if a plurality of the pre-fetch requests are issued simultaneously from each of the instruction RAM controllers, the pre-fetch controller selects a pre-fetch request having the least time allowance.

According to a seventh aspect, there is provided a communication control device of a multi-processor configuration comprising, for each of a plurality of physical layers of communication control, a communication-oriented circuit, a processor for controlling the communication-oriented circuit, an instruction random access memory RAM for pre-fetching and storing instruction data fetched by the processor and an instruction RAM controller for controlling the instruction RAM, the communication control device comprising:

a common one instruction ROM for storing the instruction data for the plural physical layers; and one pre-fetch controller for the plural physical layers for controlling pre-fetch from the instruction ROM;

the instruction RAM controller of each physical layer outputting a pre-fetch start address to a pre-fetch request for the instruction data;

the pre-fetch controller operating, responsive to the pre-fetch request, for broadcast-transferring a pre-fetch start address for the instruction ROM and instruction data pre-fetched by the pre-fetch controller from the instruction ROM to the plural instruction RAM controllers.

According to an eighth aspect, there is provided a semiconductor integrated circuit device of a multi-processor configuration capable of coping with a plurality of lines, and which includes, for each of a plurality of physical layers of communication control, a communication-oriented circuit, a processor for controlling the communication-oriented circuit, an instruction random-access memory RAM operating as a cache memory for the processor and an instruction RAM controller for controlling the instruction RAM, the semiconductor integrated circuit device comprising:

an external instruction storage device for the semiconductor integrated circuit device, in which are stored instruction data to be loaded in each instruction RAM in each of the physical layers;

the instruction RAM being of a plural bank configuration in which, when one bank is being rewritten, the processor is able to access another bank, with the instruction data being rewritten in each bank in an amount corresponding to a volume of the bank read out from the instruction storage device;

the instruction RAM controller of each physical layer having a pre-fetch command register accessed by the processor;

there being set in the command register a start address of the instruction memory device to be pre-fetched, a bank number of the instruction RAM in which the pre-fetched instruction data is loaded and an information pertinent to time allowance, i.e., deadline time until the instruction data is used, subject to a pre-fetch request command from the processor;

the information pertinent to time allowance as set in the command register being output to a pre-fetch controller along with a pre-fetch request signal and the start address;

there being provided a common one of the pre-fetch controller for a plurality of the instruction RAM controllers of the physical layers, the pre-fetch controller being provided with an interfacing unit for the instruction memory device;

the pre-fetch controller including means for selecting a pre-fetch request with the least time allowance when a plurality of pre-fetch requests from the instruction RAM controllers of the physical layers are being output simultaneously;

the instruction data of a specified bank of the instruction RAM being updated responsive to the selected pre-fetch request.

According to a ninth aspect, there is provided a semiconductor integrated circuit device of a multi-processor configuration coping with a plurality of lines, and which includes, for each of a plurality of physical layers, termed PHYs, of communication control, a communication-associated circuit, a processor for controlling the communication-associated circuit, an instruction random-access memory RAM operating as a cache memory for the processor and an instruction RAM controller for controlling the instruction RAM, the semiconductor integrated circuit device comprising:

an external instruction storage device for the semiconductor integrated circuit device, in which are stored instruction data to be loaded in each instruction RAM in each of the PHYs;

the instruction RAM being of a plural bank configuration in which, when one bank is being rewritten, the processor is able to access another bank, with the instruction data being rewritten in each bank in an amount corresponding to a volume of the bank read out from the instruction storage device;

the instruction RAM controller of each PHY having a pre-fetch command register accessed by the processor;

there being set in the command register a start address of the instruction memory device to be pre-fetched, and a bank number of the instruction RAM in which the pre-fetched instruction data is loaded;

there being provided a common one of the pre-fetch controller for a plurality of the instruction RAM controllers of the PHYs, the pre-fetch controller being provided with an interfacing unit for the instruction memory device;

the start address as set in the command register being output to the pre-fetch controller along with a pre-fetch request signal;

the pre-fetch controller including means for broadcasting the start address to instruction RAM controllers of a totality of PHYs, responsive to a pre-fetch request from the instruction RAM controller, the broadcasting means also broadcasting the instruction data read out from the instruction memory device to the instruction RAM controllers of the totality of PHYs;

the instruction RAM controllers of the PHYs including means for comparing whether or not the start address of the broadcast-transferred instruction data coincides with a start address as set in a command register of an own instruction RAM controller, the broadcast-transferred instruction data being written on coincidence of the broadcast-transferred instruction data in a specified bus of the instruction RAM.

BRIEF DESCRIPTION OF THE DRAWINGS

FIG. 3 shows an embodiment of a command register in an embodiment of the present invention.

PREFERRED EMBODIMENTS OF THE INVENTION

Figure 1:
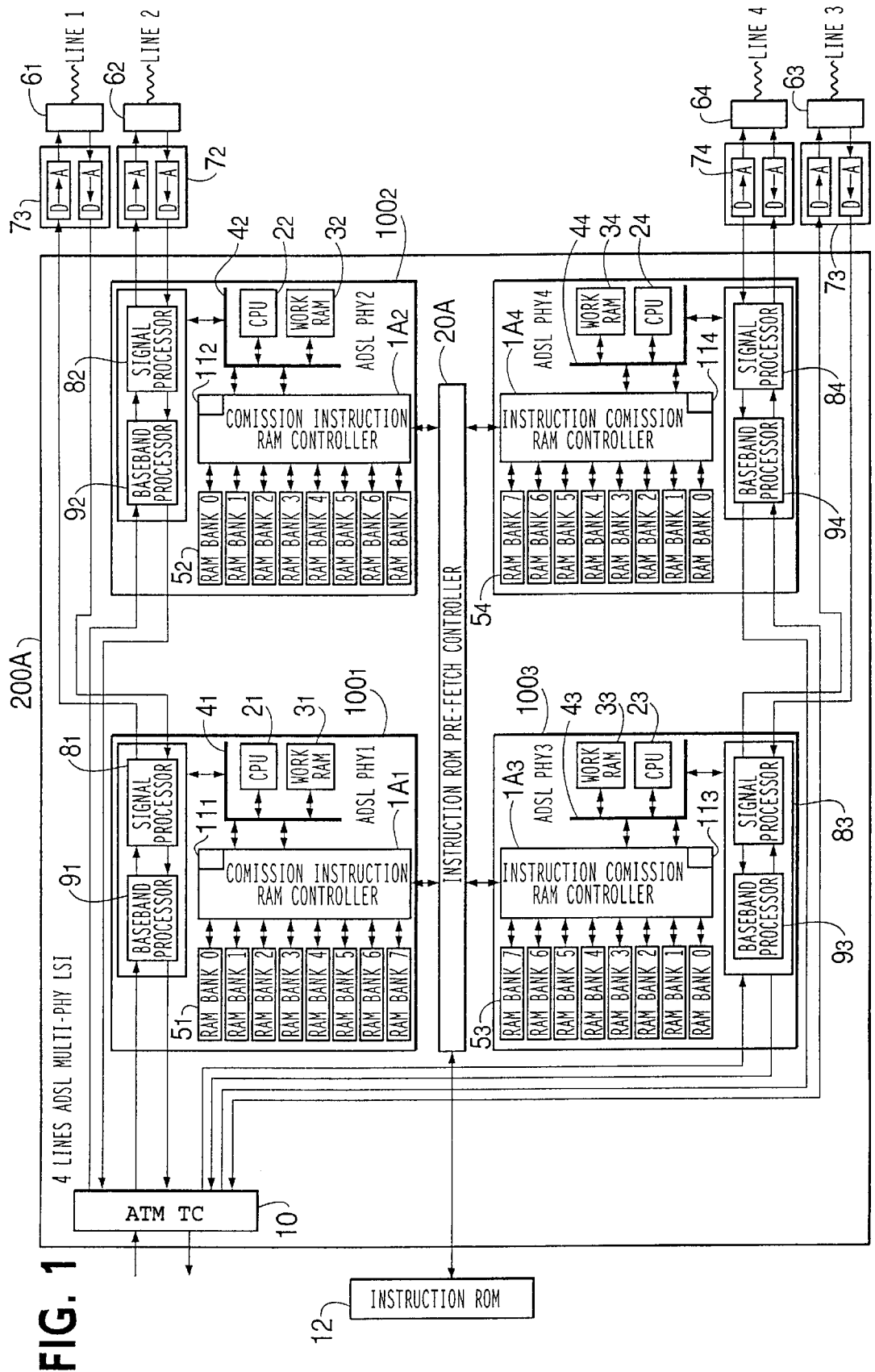
FIG. 1 shows the overall structure of an embodiment of the present invention.

In the following, certain preferred embodiments of the present invention will be explained in detail. In a preferred embodiment of the present invention, there is provided a cache memory control device for a multi-processor system for reading out data from an instruction memory device on a pre-fetch request from a processor for loading the read-out data in the instruction RAM for the cache memory (also termed an instruction RAM) provided in association with each of plural processors, in which a field indicating the time when the pre-fetch data is required is provided in the pre-fetch request command from the processor, so that the pre-fetch controller determines the priority sequence of processing pre-fetch request commands to pre-fetch data from a cache memory of a selected processor from the instruction memory device.

The multi-processor system according to the present invention is able to cope with plural communication lines or plural channels, such as plural data channels over which input/output data of plural input/output devices are transmitted and includes a processor, a cache memory and a cache memory controller for each channel or line. The multi-processor system includes a common one-memory device for the cache memories, for storage of instruction data executed by each processor. There is provided control means for exercising control so that, if pre-fetch requests are issued simultaneously from plural cache controllers, pre-fetch of the instruction data from the instruction memory device to the cache memory will be performed beginning from the cache memory with the least time allowance, based on the information indicating the time allowance until a scheduled timing of actual use of the instruction data pre-fetched to the cache memory.

By this configuration, the instructions required by each processor can be transferred efficiently from one instruction memory device, such that one instruction memory device may be co-owned by the respective processors.

More specifically, the present invention provides a communication LSI of the multi-processor configuration capable of coping with plural lines, in which the LSI includes, for each of a plurality of physical layers (PHYs) of communication control, a communication-based circuit, a processor for controlling the communication-based circuit, an instruction RAM (random-access memory) operating as a cache memory for the processor and an instruction RAM controller (1A) for controlling the instruction RAM. There is provided an external instruction storage device for the semiconductor integrated circuit device, in which are stored instruction data to be loaded in each instruction RAM in each of the PHYs. There is also provided in the instruction RAM controller for each PHY a pre-fetch controlling command register (11) accessed by the processor (2).

The instruction RAM (5) is made up of plural banks, such that, even when a given bank is under rewriting, the processor (2) can access another bank, and hence the instruction data for one bank-volume read out from the instruction memory device (12) is rewritten from bank to bank.

In the command register (11), there are set a start address for instruction data of the instruction RAM (12) pre-fetched, the number of the bank of the instruction RAM in which pre-fetched instruction data is loaded, and the information on the time allowance (allowance degree for time, i.e., deadline time) until the time the instruction data is to be used in the processor.

The information on time allowance (deadline time) as set in the command register (11) is output along with the pre-fetch request signal and the start address to the pre-fetch controller (20A).

The pre-fetch controller (20A), provided with an interfacing unit for the instruction RAM (12), is provided for each of the instruction RAM controllers of the plural PHYs.

If the instruction RAM controllers (1A) of plural PHYs output pre-fetch requests simultaneously, the pre-fetch controller (20A) selects a pre-fetch request with the least time allowance.

In another embodiment of the present invention, the instruction ROM pre-fetch controller (20B) broadcasts the start address of the instruction RAM (12) to be pre-fetched, pre-fetch start signal and the pre-fetch end signal to the instruction RAM controllers (1B) of the totality of the PHYs.

If the broadcast start address coincides with the pre-fetch start signal of the pre-fetch request issued by a given instruction RAM controller (1B) of each PHY, and the instruction RAM controller (1B) receives a pre-fetch start signal, the instruction RAM controller (1B) deems that the own pre-fetch request has been accepted and writes the broadcast-transferred instruction data in a bank of the instruction RAM.

By providing plural command registers for pre-fetch in each instruction RAM controller (1B) of each PHY (channel), the pre-fetch requests output with the same address from the respective PHYs tend to be overlapped. In this case, instruction data can be written in plural banks of plural instruction RAMs on broadcasting pre-fetched instruction data once, thus assuring shorter pre-fetch processing time.

DETAILED DESCRIPTION OF PREFERRED EMBODIMENTS

For elucidating the preferred embodiments of the present invention, these preferred embodiments will be explained in detail by referring to the drawings.

Figure 12:
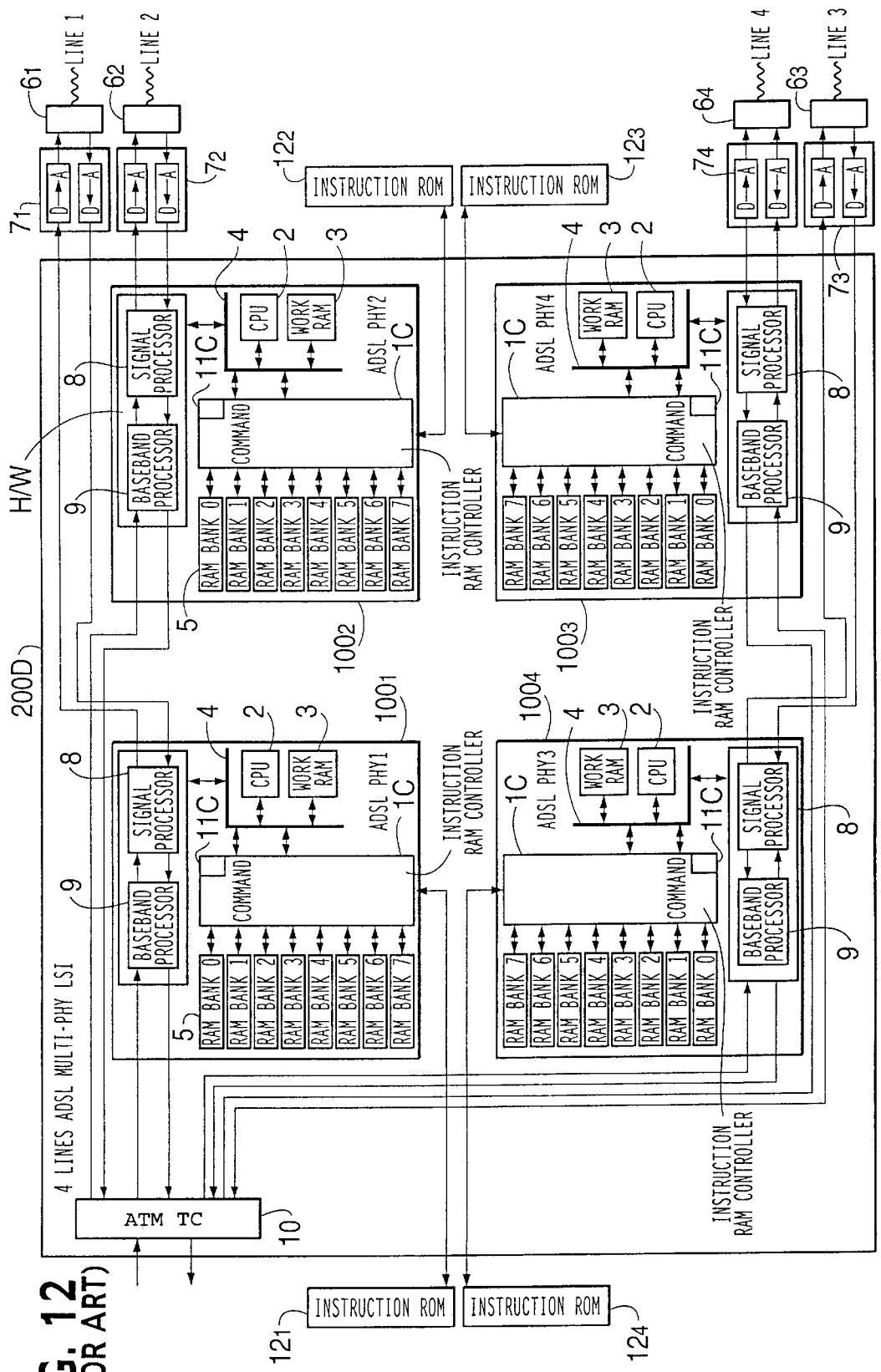
FIG. 12 shows a structure of a conventional multi-PHY LSI.

FIG. 1 shows the structure of an embodiment of the present invention and, more specifically, the structure of a sole LSI, which implements an ADSL modem (ADSL PHY), for four lines. In FIG. 1, parts or components, which are the same as or equivalent to those shown in FIG. 12, are denoted by the same reference numerals.

A LSI 200A, shown in FIG. 1, has enclosed therein four circuit blocks $100_1$ to $100_4$ for supporting a PHY (physical layer) of a sole line. Each PHY includes a communication system hardware, made up of a baseband processing unit 9 for performing baseband processing of transmission data and a signal processor 8 for performing modulation/demodulation processing, a processor (CPU) 2 for controlling the hardware, a work RAM (random access memory) 3, used by the processor 2, an instruction RAM controller (1A) and an instruction RAM 5. In the following description, subscripts of the reference numerals, corresponding to the numbers of the circuit blocks $100_1$ to $100_4$, such as those in the CPUs $2_1$ to $2_4$ or instruction RAM controllers $(1A)_1$ to $1A_4$, in the circuit blocks, are omitted except if these subscripts are necessary.

In the preferred embodiment of the present invention, the LSI 200A includes an instruction ROM pre-fetch controller (20A) in common for the four PHYs (physical layers).

The instruction RAM 5 for pre-fetching and storing instruction data executed on the processor 2 is of, e.g., a bank structure of 1K word by 8 banks, where 1 word=4 kbytes, and operates as a cache memory for the instruction RAM (12) placed outside of the LSI.

The instruction RAM 5 of each PHY is controlled by the instruction RAM controller (1A). From the instruction RAM 12, a memory volume (capacity) for one bank is rewritten (updated) by a sole pre-fetch processing in terms of a bank of the instruction RAM 5 as a unit. In the instruction RAM (12) are stored instruction data loaded in the instruction RAM 5 on the bank basis. Meanwhile, in the instruction RAM 5, the instruction data is made up of commands (instructions) executed on the processor 2 and data.

The function of the instruction RAM controller (1A) in the preferred embodiment of the present invention is hereinafter explained.

In accordance with an instruction pre-fetch request from the processor 2, proper instruction data are sent from the instruction RAM 5 to the processor 2 in case of cache hit.

In accordance with a pre-fetch request command (cache memory update request command) executed on the processor 2, instructions for one bank are pre-fetched at an arbitrary time point to update the instruction RAM 5.

If there lacks in the instruction RAM 5 proper instruction data to be supplied to the processor 2 responsive to an instruction fetch request from the processor 2 (that is, in case of cache miss-hit), instructions for one bank as required are pre-fetched from the instruction RAM 12.

In a preferred embodiment of the present invention, the instruction RAM controller (1A) of each PHY is connected to the external instruction ROM 12 via an instruction ROM pre-fetch controller (20A) provided in common for the four circuit blocks $100_1$ to $100_4$.

In accordance with a pre-fetch request, output from the instruction RAM controller (1A) of each PHY, the instruction ROM pre-fetch controller (20A) pre-fetches instruction data from the instruction RAM (12) to route the instruction data as pre-fetched to the instruction RAM controller (1A).

The instruction RAM controller (1A), which has received instruction data from the instruction ROM pre-fetch controller 20, updates a relevant bank of the instruction RAM 5.

Meanwhile, if the instruction RAM (12) is co-owned in this manner by plural instruction RAM controller $(1A)_1$ to $1A_4$, the instruction ROM pre-fetch controller (20A) is required to exercise control so as to process pre-fetch requests from the plural PHYs efficiently to minimise the occurrences of miss-hits. However, these measures will lower the processing efficiency inevitably.

With this in view, an embodiment of the present invention is provided with an information field (dead run time) indicating time allowance as to when the pre-fetch data is required responsive to the pre-fetch request output from the instruction RAM controller (1A) of the plural PHYs. This time allowance indicates how cache updating is temporally impending, and has e.g., 0 as a lower limit value, with the cache updating being the more impending the smaller the time allowance value. On receipt of plural pre-fetch requests, the instruction ROM pre-fetch controller (20A) determines the priority sequence of pre-fetch processing in the instruction ROM pre-fetch controller (20A) depending on the value of the dead run time of the pre-fetch request.

Should plural pre-fetch requests be made, the pre-fetch processing is executed, beginning from the pre-fetch request with the least time allowance, whereby the possibility of the instruction data being pre-fetched in the instruction RAM 5 until the time point the processor 2 uses the instruction data is increased. This suppresses the occurrence of miss-hits to improve the processing performance of the processors 2 of the plural PHYs, in a manner explained hereinafter in detail.

A pre-fetch request by a software command, executed by the processor 2 (instruction pre-fetch command) is executed by writing a pre-fetch request command in a pre-fetch command register 11C provided in a control register in the instruction RAM controller (1A). Within the instruction RAM controller (1A), there is provided a bank register for performing a bank selection command of the instruction RAM 5. Bank selection control for performing, e.g., bank selection using the bank register is carried out by a conventional method.

FIG. 3 shows an example of a bit field of a pre-fetch command register 11, sometimes abbreviated to "command register".

In the command register 11, a ROM address designates upper eight bits of an address of a pre-fetch instruction in the instruction ROM 12.

If the address is of 20 bits, lower 12 bits of a readout address for the instruction RAM an address generator in a range from 0H to FFFH, as will be automatically generates 12 explained subsequently (H means hexadecimal notation). For example, if the ROM address is 1FH, instruction data from 1F000H to 1FFFFH (4K bytes) are pre-fetched by one pre-fetch request.

In the command register 11, the Bank Number designates bank numbers of from 0 to 7 of the instruction RAM 5 adapted for storing instruction data pre-fetched from the instruction RAM 12.

In the command register 11, the deadline time designates the dead line time (time allowance) until completion of pre-fetch. This field is decremented (subtracted) whenever a unit time interval elapses, after being set in the command register 11, that is as long as a pre-fetch request is output. The unit time of decrementing the dead line time is pre-scribed as appropriate in the communication line (or network), every processing time unit, depending on the particular application, such as one symbol period (250 μsec) in the ADSL.

In the command register 11, a busy flag is set to "1" or "0" on issuance of a pre-fetch request command to the command register 11 and on completion of processing, respectively. The busy flag being "0" indicates that the issuance of a command is possible. The processor 2 checks this busy flag and, if the value of the busy flag is "0", the processor writes in the command register 11 under the pre-fetch command. The processor 2 accesses the pre-fetch command register 11 of the control register for pre-fetch, among the control registers of the instruction RAM controller (1A) over the internal bus 4 to set its value. Whether or not the value set on the command register 11 is inappropriate, such as the dead line time being of a minus value, is verified by a software executed on the processor 2.

Figure 2:
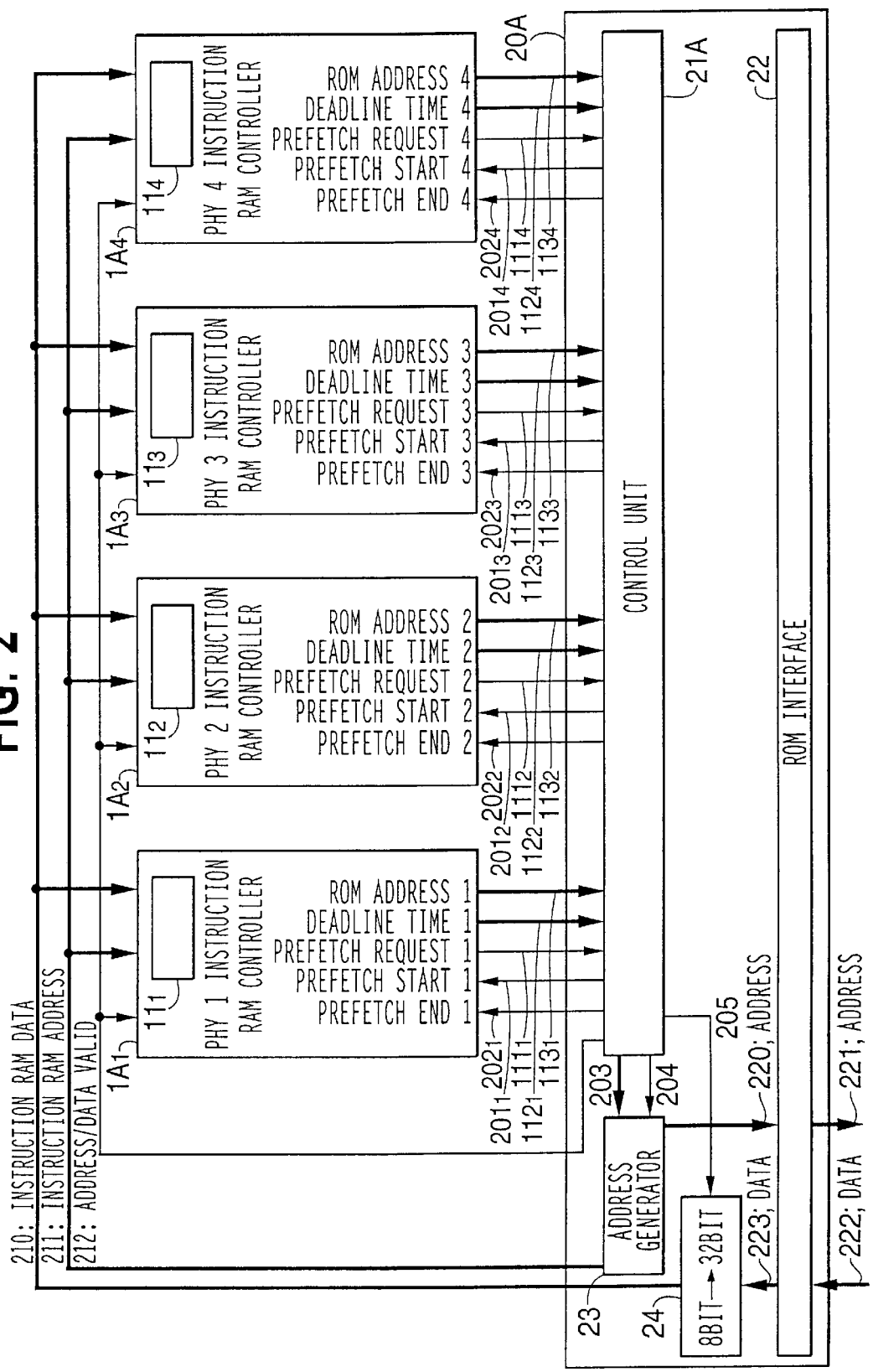
FIG. 2 shows the structure of an embodiment of the present invention.

FIG. 2 illustrates the structure of the instruction RAM controller (1A) and instruction ROM pre-fetch controllers 20A of plural PHYs.

In accordance with the instruction fetch request, executed by the processor 2 at an arbitrary time point, the instruction RAM controller (1A) of each PHY performs control to execute the pre-fetching of instructions for one bank, while performing control to pre-fetch one bank volume of instruction data in as required in case of miss-hit.

In making an instruction pre-fetch request for one bank, the instruction RAM controller (1A) outputs a pre-fetch request 111, along with a pre-fetch start ROM address (ROM address) 113 and the deadline time 112, to the instruction ROM pre-fetch controller (20A).

Of these, the pre-fetch request 111 is output when the information is set in a pre-fetch command register 11 in the instruction RAM controller (1A) in the PHY which has issued the pre-fetch request, while the information set in the command register 11 is output as the pre-fetch start ROM address (ROM address) 113 and the deadline time 112.

Of these, the deadline time is decremented per unit time in the instruction RAM controller (1A). Of course, control may be so performed that the deadline time will be decremented by the control unit 21A of the instruction ROM pre-fetch controller (20A) after capturing the deadline time 112 from the instruction RAM controller (1A) by the control unit 21A of the instruction ROM pre-fetch controller (20A).

The instruction RAM controllers $(1A)_1$ to $1A_4$ of the plural PHYs are fed from the instruction ROM pre-fetch controller (20A) with instruction RAM data 210 (instruction data pre-fetched and converted into 32-bit data by an 8-bit to 32-bit converter 24 as later explained), instruction RAM addresses 211 (addresses 000H to 3FFH of a relevant bank of the instruction RAM 5 in which to store pre-fetched data) and with an address/data valid signal 212, in a common bus format.

The instruction ROM pre-fetch controller (20A) is here-inafter explained.

The instruction ROM pre-fetch controller (20A) includes a control unit 21A, an address generator 23, an 8-bit to 32-bit converter 24 and a ROM interface 22. The control unit 21A receives a pre-fetch request 111, a pre-fetch start ROM address (ROM address) 112 and a deadline time 113 from the instruction RAM controller (1A) of each PHY to control the pre-fetch processing.

The address generator 23 includes an address counter, not shown, for receiving upper 8 bits of the ROM address, specified by the command register 11 of the instruction RAM controller (1A) and output to the control unit 21A of the instruction ROM pre-fetch controller (20A), from the control unit 21A, as an address signal, and for directly using upper 8 bits of the ROM address as upper 8 bits of the readout address of the instruction RAM (12) to generate addresses 220 from 000H to FFFH as lower 12 bits of the readout address of the instruction RAM 12. The address generator 23 also outputs an instruction RAM address 211 for writing data in a relevant bank of the instruction RAM 5. The control signal 204, output from the control unit 21A to the address generator 23, commands address generation.

If pre-fetch execution is selected responsive to the pre-fetch request from the instruction RAM controller (1A) of a certain PHY, the control unit 21A delivers a pre-fetch start signal 201 to the instruction RAM controller (1A) of the relevant PHY. On receipt of this signal, the instruction RAM controller (1A) inactivates the currently activated pre-fetch request 111.

The control unit 21A delivers the pre-fetch start ROM address of the selected pre-fetch request to the address generator 23. A 20-bit address 220, synthesized by the address generator 23, is output through the ROM interface 22 as a read-out address 221 of the instruction RAM 12. Data (8-bit data) 222, read out from the instruction RAM 12, is received by the ROM interface 22.

If the pre-fetch request from the instruction RAM controllers (1A) of plural PHYs is in an activated state, the pre-fetch request output from the instruction RAM controller (1A) of the PHY with the least current deadline time is most preferentially selected. If there is only one pre-fetch request in the activated state, the control unit 21A selects the pre-fetch request.

The data (8-bit data) received by the ROM interface 22 and read out from the instruction RAM (12) are sent to the 8-bit to 32-bit converter 24.

The 8-bit to 32-bit converter 24 collects four one-byte data and converts the data into instruction RAM data 210 of 32-bit width which is supplied along with the instruction RAM address 211 to the instruction RAM controller (1A). The instruction RAM controller (1A) loads the data on the instruction RAM data 210 along with the instruction RAM address 211 on the instruction RAM controller (1A), which then loads the data on the instruction RAM data 210 in the relevant bank of the instruction RAM 5.

The address/data valid signal 212 (Address/Data Valid) indicates validity/invalidity of the instruction RAM data 210 and the instruction RAM address 212. The instruction RAM controller (1A), which has issued the pre-fetch request, takes the address and data when the address/data valid signal 212 (Address/Data Valid) indicates a valid state to write instruction data in a bank of the instruction RAM 5.

When the pre-fetch has come to a close, the instruction ROM pre-fetch controller (20A) outputs a pre-fetch end signal 202 to the instruction RAM controller (1A). On receipt of the pre-fetch end signal 202, the instruction RAM controller (1A) resets a busy flag of the command register 11.

Figure 4:
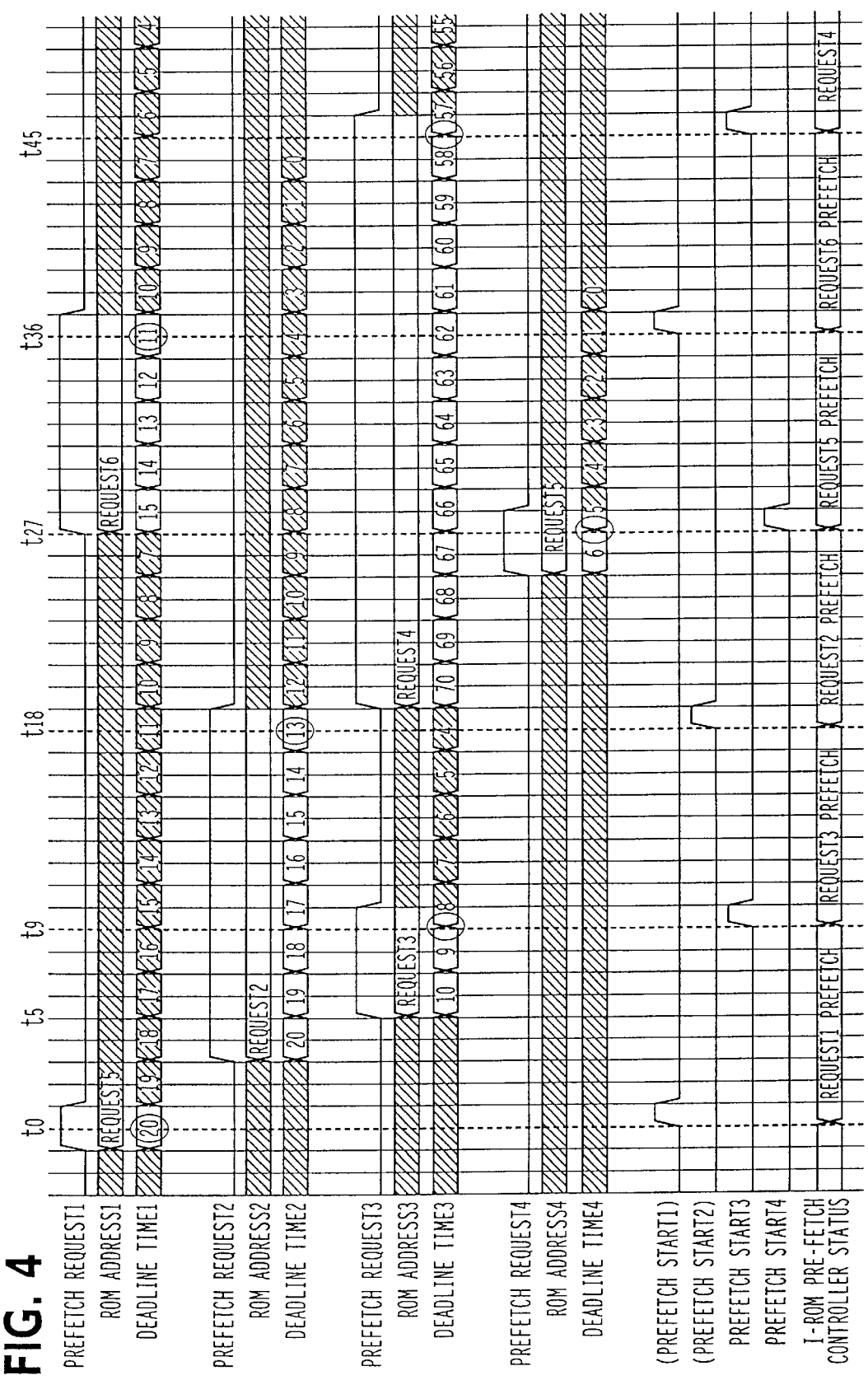
FIG. 4 illustrates the timing operation of one of the present invention.

FIG. 4 shows the operational timing in an embodiment of the present invention. If pre-fetch requests from plural PHYs overlap, the instruction ROM pre-fetch controller (20A) refers to the deadline time and processes the pre-fetch requests of the PHYs beginning from the pre-fetch request with the smallest deadline time to enable one instruction RAM (12) to be co-owned by respective PHYs without lowering the processing capacity of the processor 2.

If the dead line time of plural pre-fetch requests, output from the instruction RAM controller (1A), is of the same value, the instruction ROM pre-fetch controller (20A) selects one pre-fetch request, by a preset method, such as by making selection beginning from the pre-fetch request of the PHY bearing the smaller number.

Referring to FIG. 4, if there is raised at time t0 a pre-fetch request (pre-fetch request 1) from the PHY1, with the deadline time 1 being [20], there is no pre-fetch request from other PHYs, so that the instruction ROM pre-fetch controller (20A) directly selects this pre-fetch request 1. The controller 1A turns the pre-fetch start 10N to execute the pre-fetch processing of the pre-fetch request 1.

It is assumed in the embodiment of FIG. 4 that 9 cycles are needed in the pre-fetch processing, that is in the processing as from reading out the instruction data in an amount of 4K bytes from the instruction RAM (12) until writing the data in the relevant bank of the instruction RAM 5. During the time period of t0 to t8, the status of the instruction ROM pre-fetch controller (20A) is the pre-fetch of the pre-fetch request 1.

Moreover, in the present embodiment, a pre-fetch request is issued from the instruction RAM controller (1A) in a state in which the status of the instruction ROM pre-fetch controller (20A) is not the status of processing the pre-fetch. Moreover, if a sole pre-fetch request is output, the processing of the pre-fetch is executed immediately.

At time t3 during the t0-t8 period, the pre-fetch request 2, with the deadline time 2 being [20], is in an on state. On the other hand, at time t5, the pre-fetch request 3, with the deadline time 2 being [10], is in an on state. However, since pre-fetch processing for the pre-fetch request 1 is going on, these pre-fetch requests 2, 3 are not accepted, that is pre-fetch start signals 2, 3 do not turn ON, provided that the pre-fetch requests 2, 3 remain in the on-state. During this time, the deadline time of the pre-fetch requests 2, 3 are decremented every preset time interval.

At a time point t9 when the pre-fetch of the pre-fetch request 1 comes to a close, the instruction ROM pre-fetch controller (20A) selects the pre-fetch request 3 with the deadline time of [8] to execute pre-fetch. At a time point t9, the pre-fetch request 2 with the d 2 of [17] is not processed.

During the time interval of t9 to t17, the status of the instruction ROM pre-fetch controller (20A) is a pre-fetch request 3 (request 3 pre-fetch). So, during this time period, the instruction RAM controller (1A)$_2$ of the PHY 2 continues to output the pre-fetch request 2 (pre-fetch request 111$_2$).

At time point t18, the pre-fetch request 2, with the deadline time 2 of [13], is pre-fetch processed. During the time interval of t18 to t26, the status of the instruction ROM pre-fetch controller (20A) (status) is the pre-fetch request 2 (request 2 pre-fetch).

At time point t27, the pre-fetch of the pre-fetch request 4, with the deadline time of 5, is selected (marked at "Request 5 Prefetch").

In the embodiment shown in FIG. 4, the deadline time as set on the command register 11 is decremented at a rate of one per two cycles. The present invention is, however, not limited to this configuration.

A pre-fetch request signal, output from the instruction RAM controller (1A), is inactivated when a pre-fetch processing is selected in the instruction ROM pre-fetch controller (20A) and a pre-fetch start signal is issued.

FIG. 5 shows a flow diagram for illustrating the processing by the instruction ROM pre-fetch controller (20A) in an embodiment of the present invention.

Figure 5B:
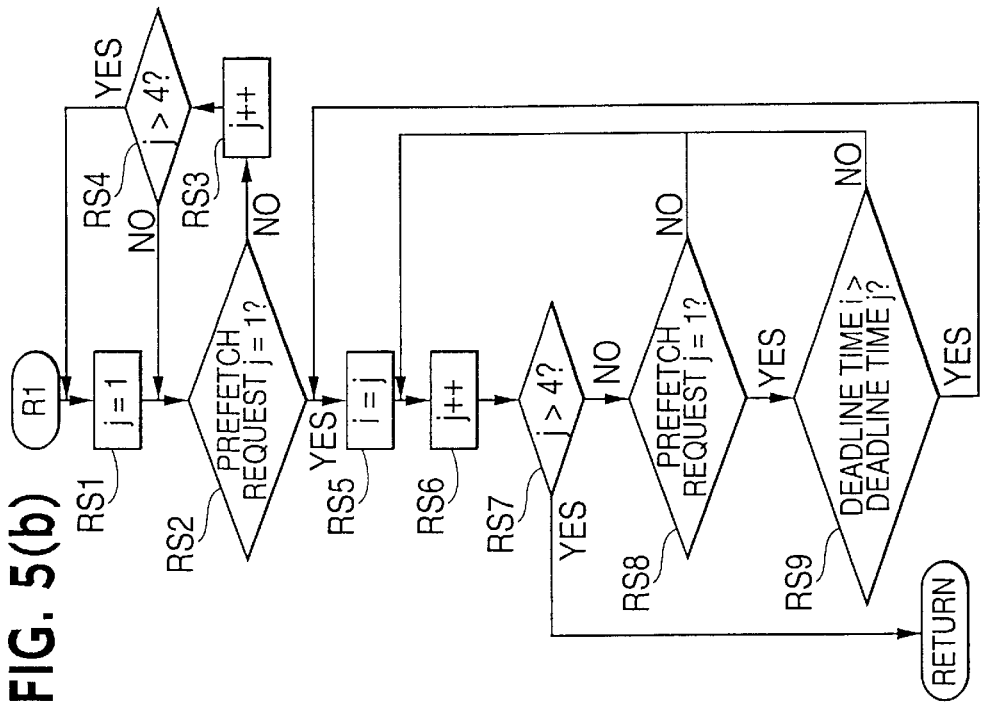
FIGS. 5(a) and 5(b) show an operating sequence of an instruction ROM pre-f etch controller 20 according to an embodiment of the present invention.
Figure 5A:
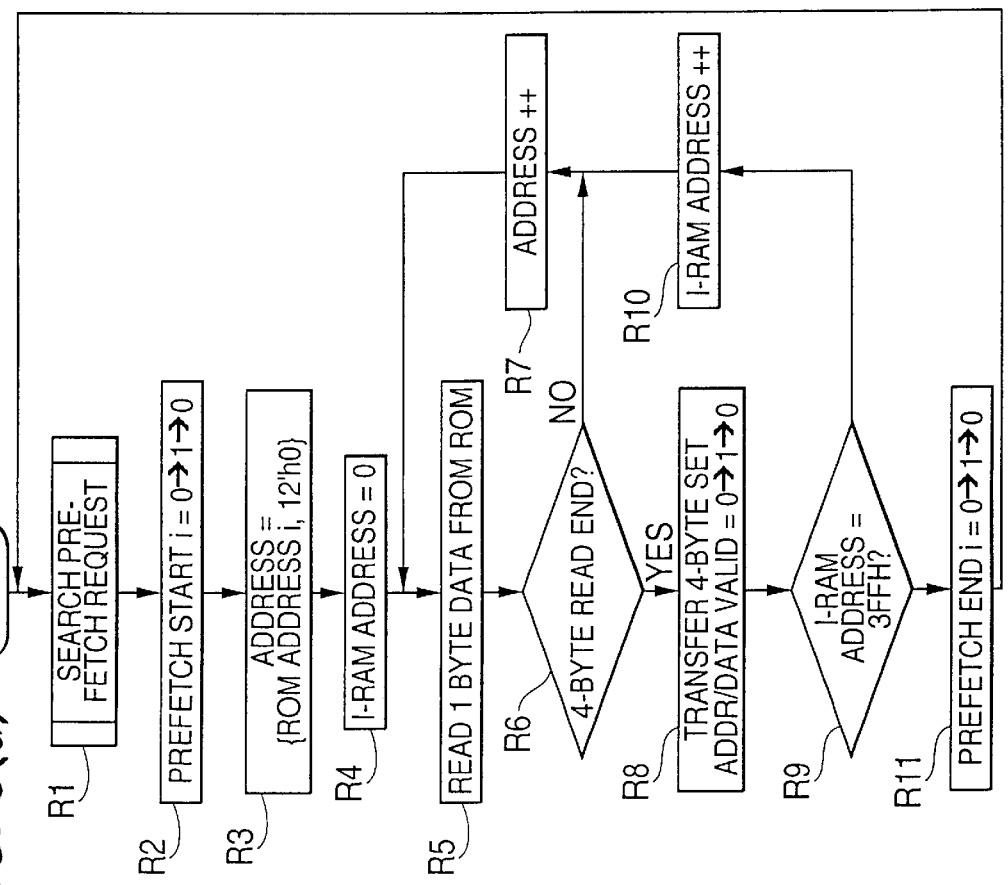

Referring to FIG. 5a, the control unit 21A first searches for a pre-fetch request (step R1).

The control unit 21A outputs a pulse signal of the pre-fetch start signal 201 associated with the pre-fetch request (0→1→0) (step R2).

The control unit 21A delivers upper 8 ROM address bits from the command register 11 to the address generator 23 where an address of the instruction RAM (12) is generated based on the upper 8 ROM address bits (step R3). The address generator 23 directly uses upper 8 bits of the ROM address specified by the command register 11 as upper 8 bits of the read-out address of the instruction RAM 12, which are rendered into lower address bits of the readout address of the instruction RAM (12) to generate ROM addresses from 000H to FFFH.

An address 211 of the instruction RAM 5 is set to 0 (step R4).

One byte is read from the instruction RAM (12) (step R5). The one-byte data 222 thus read is routed through the ROM interface 22 to the 8-bit to 32-bit converter 24.

The address generator 23 increments the address 220 of the instruction RAM (12) until four bytes are read.

At a time point when the four bytes have been read out from the instruction RAM 12, the 8-bit to 32-bit converter 24 is responsive to a control signal (output enabling signal) of the control unit 21A, to output 32-bit data, collected from four byte data, as instruction RAM data 210.

The address generator 23 checks whether or not the instruction RAM address 211 is 3FFH (corresponding to a 1K word) at step R9. If the instruction RAM address 211 is not 3FFH, the address generator 23 increments the instruction RAM address 211 at step R10 to increment the address of the instruction RAM (12) at step R7 to start reading out the instruction RAM (12) (step R5).

On the other hand, if the address of the instruction RAM address 211 is 3FFH, the control unit 21A outputs a pulse of the pre-fetch end signal 202 to the instruction RAM controller (1A) (0→1→0).

FIG. 5b shows details of the processing of searching for a pre-fetch request (step R1).

First, it is checked sequentially from a suffix j=1 to a suffix j=4 (step RS1 to RS4) whether or not there exists the pre-fetch request j equal to "1" (on). If the pre-fetch request j is "1" (YES at step RS2), j is stored in a variable i (register or memory) (step RS5) and the value of this j is incremented by one (step RS6). If j≦4 (step RS7), it is checked whether or not there exists a pre-fetch request j of the incremented j (PHY j) equal to "1" (step RS8).

If there exists the pre-fetch request j having a value of "1" (YES at step RS8), the ith and jth deadline times are compared to each other (step RS9).

If it is the deadline time j that is smaller (YES of step RS9), processing reverts to step RS5 to store this j in i to increment j. If there exists a pre-fetch request for further values of j (PHY j), the deadline time i of the ith pre-fetch request is again compared to the deadline time j of the jth pre-fetch request to find the number of the pre-fetch request having the smallest deadline time.

If, at step RS9, the deadline time i is smaller than or equal to deadline time j, processing reverts to step RS6 to increment j (step RS6) to compare the deadline time of the next pre-fetch request to the deadline time i of the current smallest pre-fetch request (comparison of the deadline time i of step RS8 to the deadline time j). By the above-described dual loop, the PHY number of the instruction RAM controller who has issued the pre-fetch request with the smallest deadline time is set in the variable i.

In an embodiment of the present invention, the instruction RAM (12) can be co-owned by plural PHYs, as the lowering of the processing performance of the CPU 2 is minimized. Executing proper instruction RAM control, such as by setting the deadline time to a proper value does not lower the processing performance.

In an embodiment of the present invention, the number of LSI external terminals by RAM co-owning can be diminished. By providing the instruction ROM pre-fetch controller (20A) with the function of processing pre-fetch requests from the plural PHYs, and by providing the command register with a field of designating the time allowance (deadline time) until pre-fetch end, it is possible for the instruction ROM pre-fetch controller (20A) to execute the pre-fetch processing sequentially beginning from the pre-fetch request with the higher priority, thus minimizing the occurrences of miss-hits.

In this manner, the processing performance of the processor of each PHY can be prevented from being lowered as the sole instruction RAM (12) is co-owned by plural PHYs. Since it is sufficient if the LSI has only one ROM interface, it is possible to reduce the number of external LSI terminals. Specifically, the terminals of the instruction RAM (12) capable of coping with four lines are an address terminal (20 bits), a data terminal (8 bits) and a control signal, such as a chip enable signal, not shown, so that the number of terminals of the instruction RAM (12) is one-fourth that of the structure shown in FIG. 12.

A second embodiment of the present invention is explained. If, in this second embodiment of the present invention, showing a pre-fetch control system for an instruction cache memory in a multi-processor system, such as an ADSL modem LSI supporting plural lines, pre-fetch request commands from the processors executing control of each PHY are pre-fetch requests originating from the same ROM address, the instruction ROM pre-fetch controller broadcasts data pre-fetched to plural PHYs.

In this manner, the time required for pre-fetch may be shorter to expedite the processing start timing after each processor resetting and at the time of processing switching.

Figure 6:
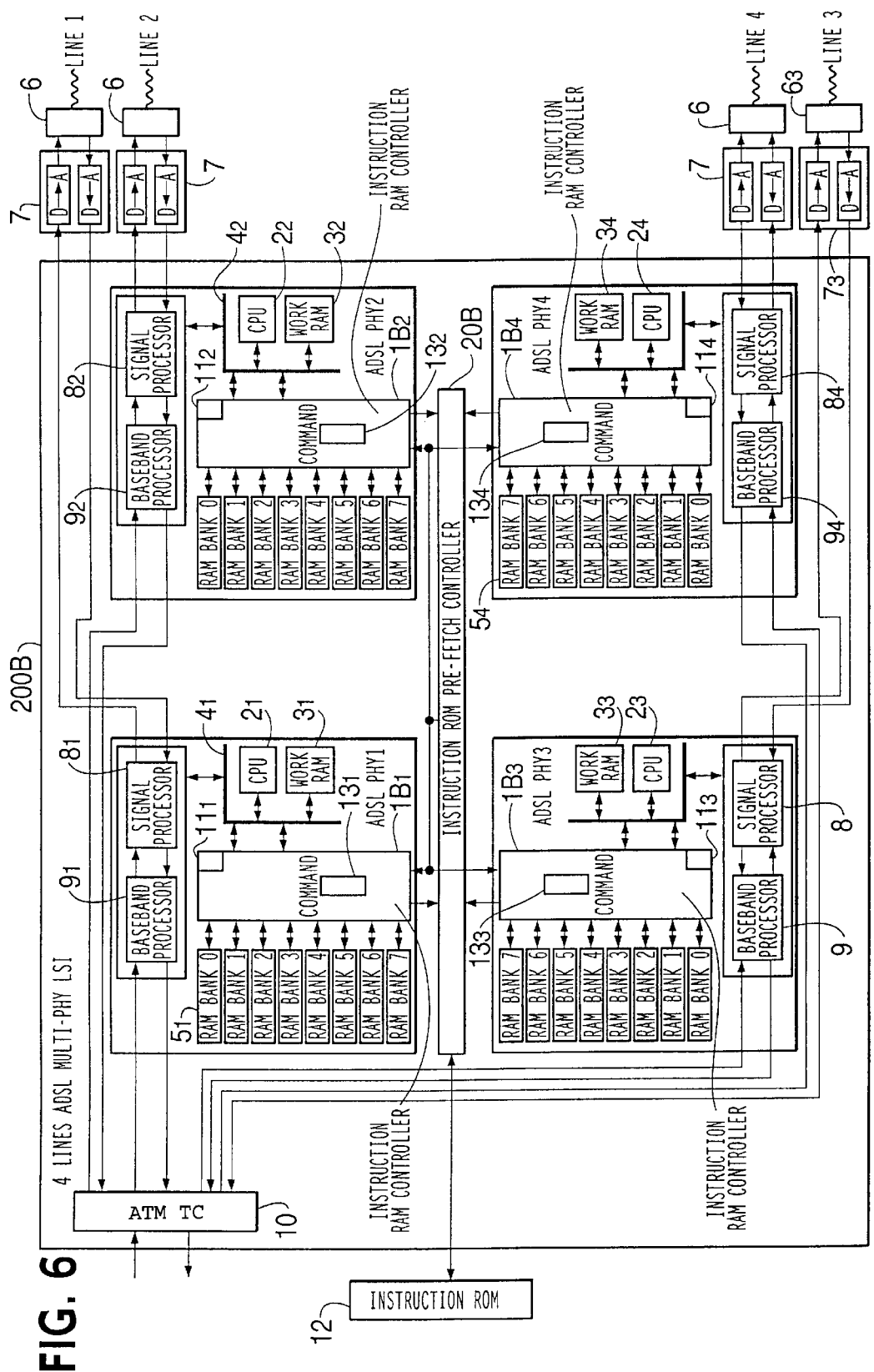
FIG. 6 shows an overall structure of a second embodiment.

FIG. 6 shows a structure of the second embodiment of the present invention and specifically shows the structure of the LSI 200B implementing the ADSL modem (ADSL PHY) for four lines by a sole LSI. This LSI 200B has enclosed therein four circuits each supporting the PHY for one line. Each PHY is made up of hardware for executing baseband processing of transmission/reception data and modulation/demodulation processing, a processor 2 for controlling these hardware, a work RAM 3 used by the processor and an instruction RAM 5. In FIG. 6, the components, which are the same in function as those shown in FIG. 1, are depicted by the same reference numerals.

The instruction RAM 5 is of a 1K word (=4K bytes)×8 bank configuration and operates as a cache memory for the externally mounted instruction RAM 12. The instruction RAM 5 of each PHY is supervised by the instruction RAM controller (1B).

The functions of the instruction RAM controller (1B) are as follows:
It furnishes proper instruction data responsive to an instruction fetch request from the processor 2;
  it pre-fetches an instructions for one bank responsive to the software pre-fetch command; and
  it pre-fetches necessary instructions for one bank to the instruction RAM 5 if, on receipt of an instruction fetch request from the processor 2 (that is, on occurrence of a miss-hit), there lacks proper instruction data to be furnished to the processor 2.

The instruction RAM controller (1B) is connected via the instruction ROM pre-fetch controller (20B) to the external instruction ROM 12.

The instruction ROM pre-fetch controller (20B) is responsive to the pre-fetch request from the instruction RAM controller (1B) of each PHY to pre-fetch the ROM 12 to send the pre-fetched instruction data to the instruction RAM controller (1B)

It is necessary for the instruction RAM controller (1B) to process pre-fetch requests from plural PHYs efficiently to minimise the occurrences of miss-hits. In the present second embodiment, if the pre-fetch requests from the plural PHYs are those from the same ROM address, the instruction ROM pre-fetch controller (20B) broadcasts the pre-fetched data to the plural PHYs to make the pre-fetch time shorter to improve the processing performance of each CPU.

By providing plural pre-fetch command registers 11 for each PHY and by providing for more facilitated overlapping of the pre-fetch requests from the same ROM address, broadcast is more likely to occur to assure a shorter mean value of the pre-fetch queuing time.

As a specified embodiment of the broadcasting, since the totality of the PHYs request pre-fetch from the same ROM address following resetting of the LSB 200B, the time until booting up the LSB 200B can be shorter by broadcasting.

Figure 7:
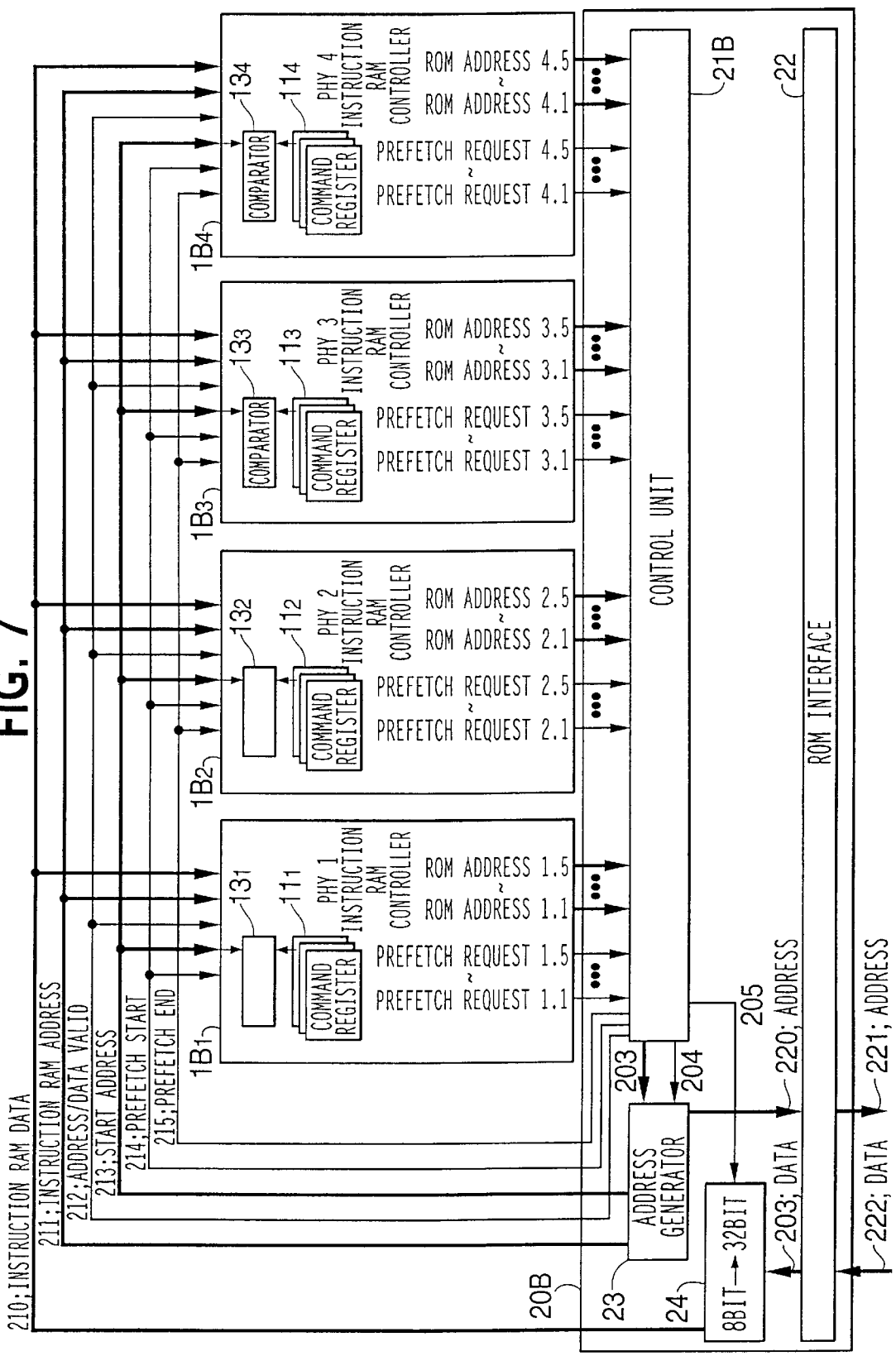
FIG. 7 shows a structure of the second embodiment of the present invention.

Referring to FIG. 7, the instruction RAM controller (1B) will be explained. Four plus one command registers 11 are provided for the instruction RAM controller (1B) of the PHY 1. The respective command registers of the set of the command registers output pre-fetch requests 1.1 to 1.5 and ROM addresses 1.1 to 1.5 made up of upper eight bit addresses of the instruction RAM 12.

The instruction RAM controller (1B) of the PHY 2 is provided with four plus one command registers, from which pre-fetch requests 2.1 to 2.5 and ROM addresses 2.1 to 2.5 are output .... The instruction RAM controller (1B) of the PHY 4 is provided with four plus one command registers, from which pre-fetch requests 4.1 to 4.5 and ROM addresses 4.1 to 4.5 are output.

The instructions for one bank are pre-fetched by outputting to the instruction ROM pre-fetch controller (20B) a pre-fetch request along with an instruction ROM address for pre-fetch starting.

From the control unit 21B of the instruction ROM pre-fetch controller 20B, a pre-fetch start signal 214 is broadcast, along with the pre-fetch start instruction ROM address 213, for which acceptance is given of the pre-fetch request to the instruction RAM controller (1B) of the processor of each PHY.

By the comparator 13, the instruction RAM controller (1B) compares the ROM address (start address), broadcast from the instruction ROM pre-fetch controller 20B, to the ROM address of the set of the command registers 11 within the own controller 1B (ROM address for which the processor itself is issuing a request), If, as a result of comparison by the comparator 13, the two coincide with each other, the pre-fetch request output based on the pre-fetch command as set on the command register is turned off, and instruction data transmitted from the instruction ROM pre-fetch controller (20B) and pre-fetched from the instruction RAM (12) is accepted and sequentially written in the instruction RAM 5.

When pre-fetch processing comes to a close, the instruction ROM pre-fetch controller (20B) broadcasts a pre-fetch end signal 215 to the instruction RAM controller (1B).

The instruction ROM pre-fetch controller (20B) pre-fetches the instruction RAM 12, in accordance with a pre-fetch request from the instruction RAM controller (1B) of each PHY, and furnishes the instruction data, thus pre-fetched, to the instruction RAM 5.

The data read out from the instruction RAM (12) are converted from 8-bit data to 32-bit data (4 bytes), in the instruction ROM pre-fetch controller 20B, with the resulting 4-byte data then being broadcast as the instruction RAM data 210 to the instruction RAM controllers (1B) of all the PHYs #1 to #4.

If the start address 213 output from an instruction ROM pre-fetch controller (20B) coincides with the ROM address in the command register 11 in the own controller, the instruction RAM controller (1B) captures instruction RAM data 210 as pre-fetch data to a pre-fetch request issued by the own controller and writes instruction data in an address specified by the instruction RAM data 210 in a relevant bank of the instruction RAM 5.

So, if a pre-fetch request to the same ROM address is derived from plural PHYs, the pre-fetch processing operations can be executed simultaneously.

Figure 8:
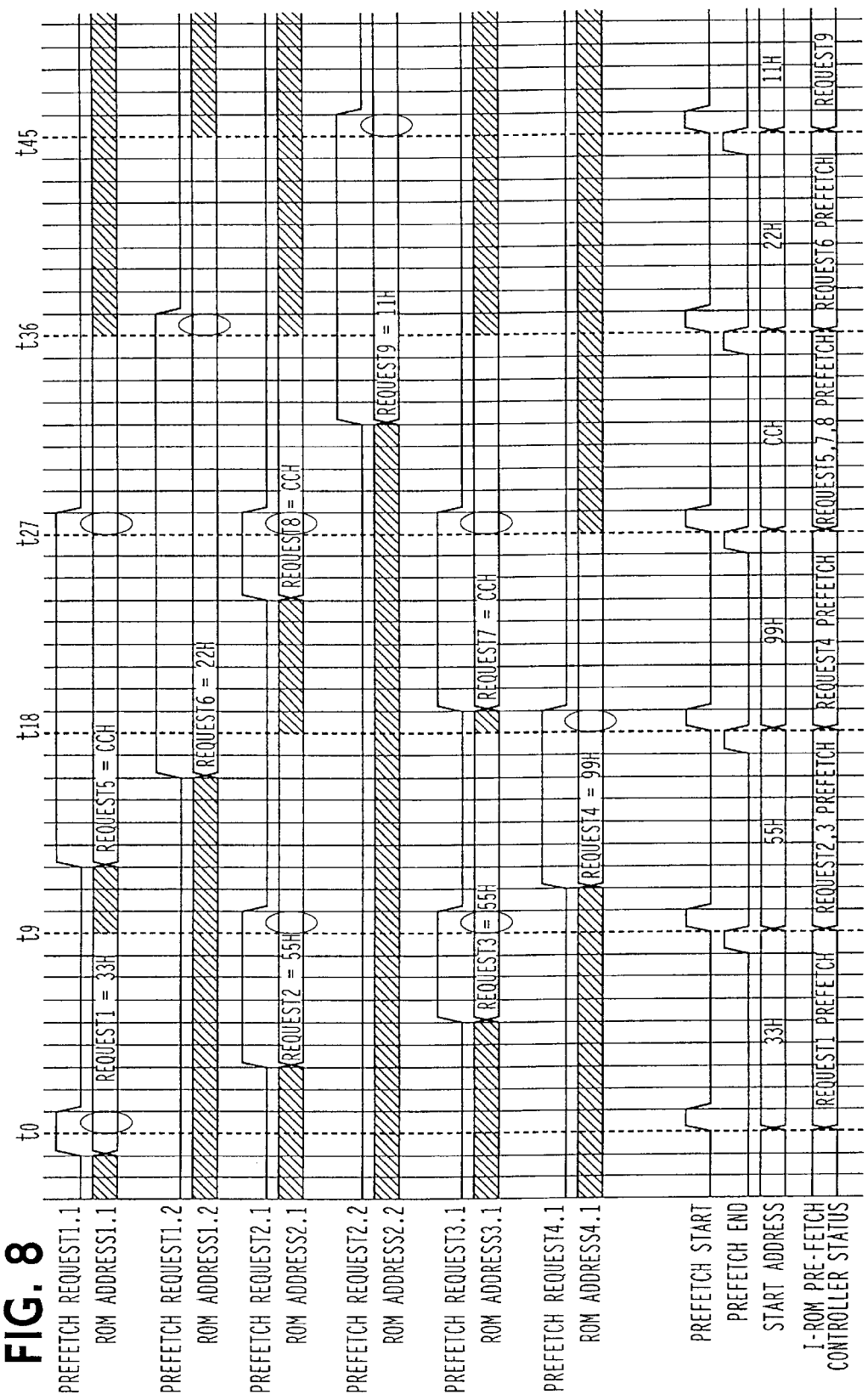
FIG. 8 shows a timing operation of the second embodiment

FIG. 8 shows an operational sequence of the instruction RAM controller (1B) and the instruction ROM pre-fetch controller 20B.

At time t0, only a pre-fetch request 1.1 from the instruction RAM controller (1B)$_1$ of PHY1 (start address=33H) is output, such that this processing is selected and the pre-fetch processing occurs during the time period of t0 to t8. Meanwhile, if the pre-fetch processing for the pre-fetch request 1.1 is to be performed, the start address and the pre-fetched instruction data are transferred through instruction data 210. The instruction data are written in the instruction RAM 5 of the bank number specified by the command register 11 which issued the pre-fetch request 1.1 of the instruction RAM controller (1B)$_1$ of PHY1 (start address= 33H).

At t9, a pre-fetch request 2.2 of PHY2 (start address=55H) and a pre-fetch request 3.1 of PHY3 (start address=55H) of the same address are output, so that the instruction data is broadcast for the pre-fetch request 2.2 of PHY2 and for the pre-fetch request 3.1 of PHY3.

The pre-fetch processing for the PHY2 and PHY3 occurs during the time of t9 to t17. In this case, in the instruction RAM controllers (1B) of the PHY2 and PHY3, the start address 213 broadcast coincides in the comparator 13 with the ROM address of the command register 11 of the own controller, so that the instruction data are written in the instruction RAM 5. However, in the other PHYs, instruction data is not written in the instruction RAM in the instruction RAM controllers (1B) of the other PHYs, because the start address 213 broadcast differs from the ROM address of the command register 11 in the own controller.

Meanwhile, since none of plural pre-fetch requests, that is pre-fetch request 1.1 or pre-fetch request 4.1, are of the same address, at time t18, the pre-fetch request 4.1 with a smaller value of the deadline time is selected, as in the previous embodiment.

FIG. 9 is a flow diagram for illustrating the processing in the instruction RAM controller (1B) in the second embodiment of the present invention. Meanwhile, each PHY is assumed to be provided with five pre-fetch command registers. As for the starting conditions, parallel starting is made up to the number of the pre-fetch command registers of four plus one (miss-hit).

Figure 9B:
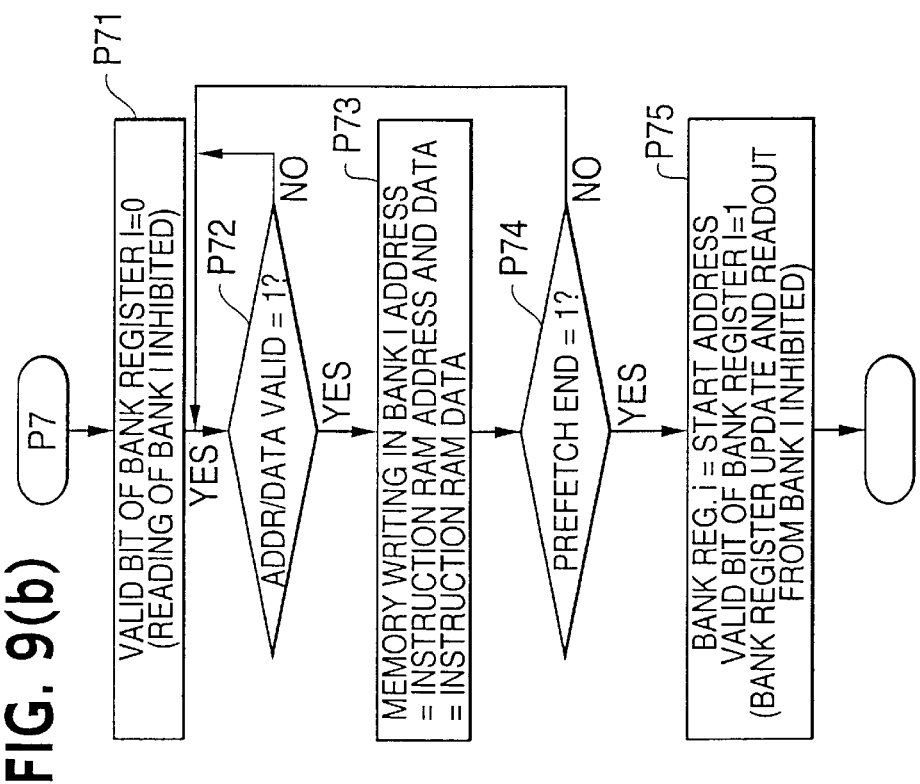
FIGS. 9(a) and 9(b) show an operational sequence of an instruction RAM controller in the second embodiment.
Figure 9A:
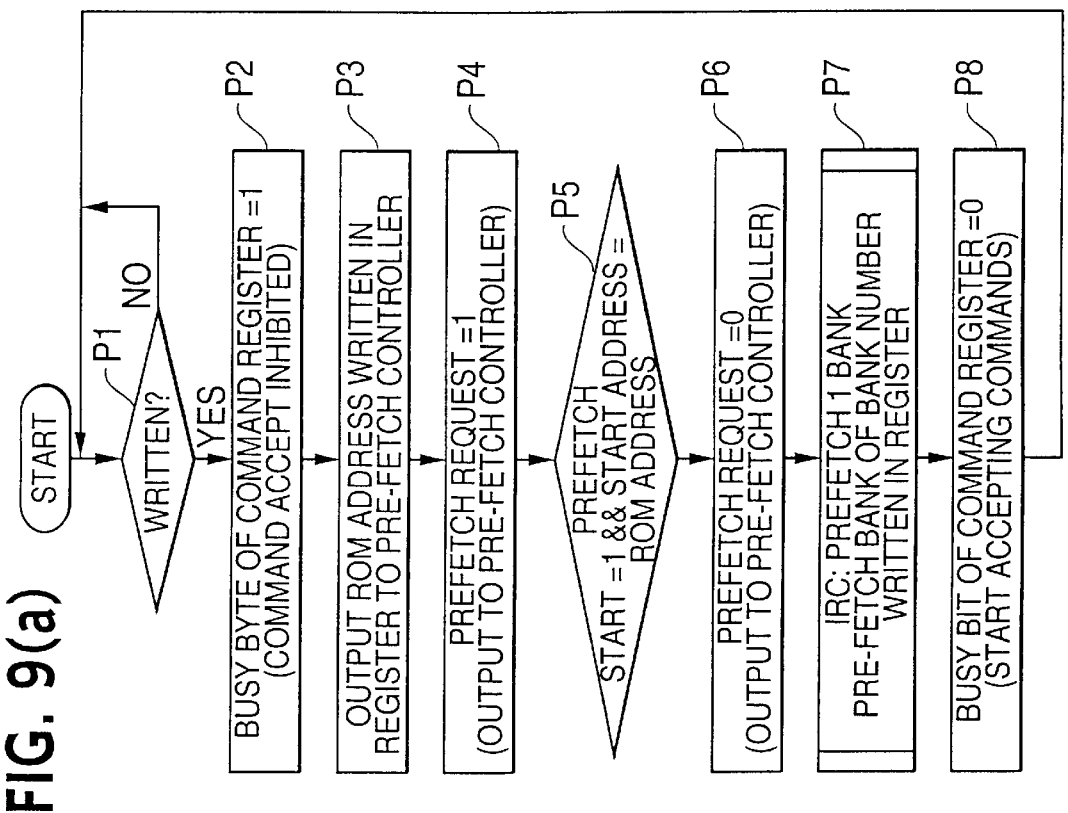

Referring to FIG. 9a, if there is writing in the command register 11 of the instruction RAM controller (1B), the busy flag of the command register 11 is set to "1" (step P2) and the ROM address written in the command register is output to the instruction ROM pre-fetch controller (20B) (step P3).

The pre-fetch request is set to "1" and output to the instruction ROM pre-fetch controller (20B) (step P4).

If the pre-fetch request is "1" and the start address 213 coincides with the ROM address of the command register 11, the pre-fetch request is set to "0" and output to the instruction ROM pre-fetch controller (20B) (step P6).

The bank of the bank number written in the command register 11 are pre-fetched to the instruction RAM 5 (step P7).

The busy flag of the command register 11 is set to "0" to enable a command to be accepted (step P8).

FIG. 9b is a flow diagram for illustrating the pre-fetch of the bank number written in the command register 11 into a bank.

The readout from the bank 1 of the processor (CPU) 2 is inhibited (step P71).

If an address data valid bit 212 is "1", pre-fetch data is written from the instruction RAM (12) to the instruction RAM 5 of bank i (step S73). At this time, the write address in the bank of the instruction RAM 5 is an instruction RAM address 211, while the write data is the instruction RAM data 210.

If a pre-fetch end 215 is "1", the bank register is updated to permit readout of the bank i (step P75).

Figure 10:
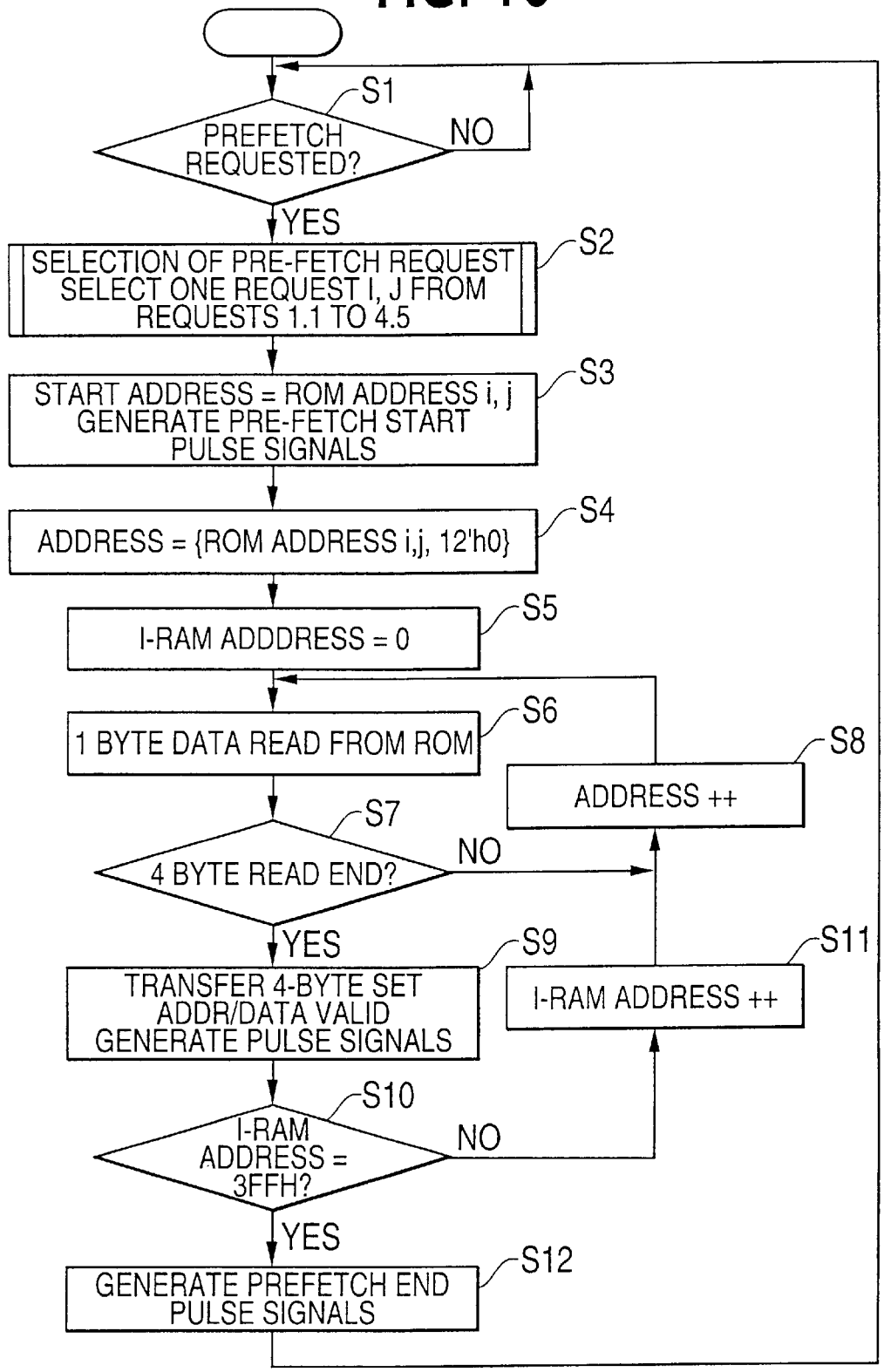
FIG. 10 shows an operating sequence of an instruction ROM pre-fetch controller according to a second embodiment of the present invention.
Figure 11:
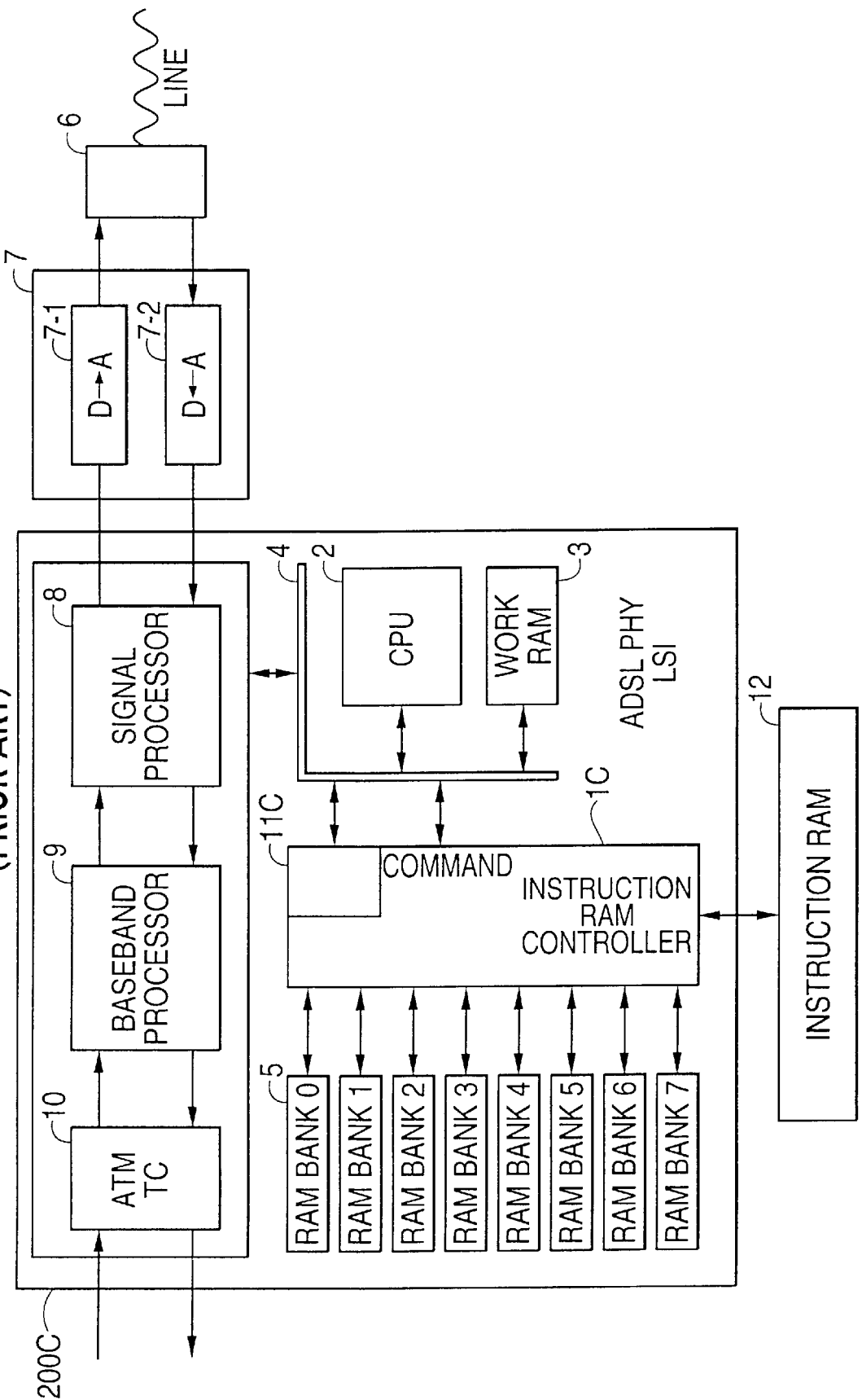
FIG. 11 shows a structure of a conventional physical layer (PHY) LSI.

FIG. 10 is a flow diagram showing the processing sequence of the instruction ROM pre-fetch controller 20B. If there is a pre-fetch request (YES of step S1), a pre-fetch request is selected (one of command registers #1 to #5 of PHY#1 to PHY#4 is selected) (step S2).

The pre-fetch start address of the instruction RAM (12) (upper 8 bits of PHY#1: ROM address of FIG. 3) is set to the ROM address of the command registers i, j (command register #j of PHY#i) to generate a pre-fetch start signal 214 as a pulse signal.

A ROM address of upper eight bits, with the lower 12 bits being 0, is generated in the address generator 23 (step S24), while the address 211 of the instruction RAM 5 is set to 0 (step S5).

One-byte data 222 are read from the instruction RAM (12) (step S6).

The address 221 in the instruction RAM (12) is incremented until four bytes are read (step S8).

If four bytes are read from the instruction RAM 12, four bytes are collected (32 bit data) which is transferred as instruction RAM data 210 to the instruction RAM controller (1B) (step S9).

It is checked whether or not the instruction RAM address 211 is 3FFH (step S10). If the instruction RAM address 211 is not 3FFH, the address generator 23 increments the instruction RAM address 211 (step S11), while incrementing the readout address of the instruction RAM (12) (step S8) to read out the instruction RAM (12) (step S6).

On the other hand, if the address of the instruction RAM 5 is 3FFH, a pulse signal of a pre-fetch end 216 is output (step S12).

In each of the above-described embodiments, the instruction RAM controller (1B) outputs, on occurrence of cache miss-hit, in writing in the pre-fetch command register 11, a pre-fetch request to the instruction ROM pre-fetch controller 20B. In writing in the four pre-fetch command registers, the number of the rewriting bank, ROM address and deadline time is set in a command parameter.

In a miss-hit, a fifth command register is selected. The instruction RAM controller (1B) searches for a bank number of the instruction RAM to be pre-fetched and sets the deadline time to 0 (lower limit value of the allowance) to perform pre-fetch processing.

The operation and the meritorious effect of the second embodiment of the present invention are explained. By broadcasting pre-fetch data, plural pre-fetch requests for the same ROM address from plural PHYs can be processed simultaneously when pre-fetch requests from plural PHYs for the same ROM address overlap one another.

Since the mean queuing time for pre-fetch is shorter, miss-hits are less likely to be produced, thus improving the processing capability of the processor.

Since the totality of the PHYs make pre-fetch requests for the same address, directly after LSI resetting, a short bootup time following resetting suffices.

The reason is that the instruction ROM pre-fetch controller (20B) broadcasts the pre-fetched data to the totality of PHYs, with the instruction RAM controller (1B) comparing the ROM address requested by the own controller to the address broadcast from the instruction ROM pre-fetch controller 20 to take pre-fetched data only on data coincidence.

Although the present invention has been explained in connection with the above-described embodiment, it is to be noted that the present invention may be applied to an optional multi-processor including plural cache memories adapted to cope with plural processors without being limited to the above-described communication LSI accommodating four lines. For example, the present invention may naturally be applied to an optional multi-processor adapted to process data of input/output channels of plural input/output devices. The configuration shown in the drawings illustrates the present invention only by way of illustration without limiting the present invention. The present invention naturally comprehends any variations and modifications that may come within the scope of the invention as defined in the claims.

The meritorious effects of the present invention are summarized as follows.

The present invention, described above, gives rise to the following meritorious effects:

The first effect of the invention is that external instruction ROMs can be co-owned by plural cache memories and that the lowering of the processing performance of the processor can be suppressed to a minimum.

The reason is that, in the present invention, the instruction ROM pre-fetch controller has the function of processing pre-fetch requests from plural PHYs and a software pre-fetch command has a field in which to specify the deadline time until the end of the pre-fetch, such that, in the instruction ROM pre-fetch controller, processing can be performed sequentially beginning from a pre-fetch request of a higher priority to suppress the occurrence of miss-hits.

The second effect of the present invention is that, since it suffices to provide a sole ROM interface, it is possible to curtail the number of the LSI external terminals.

The third effect of the present invention is that, if pre-fetch requests from plural PHYs to the same ROM address can be processed simultaneously by broadcasting the pre-fetch data, with the result that the mean queuing time for pre-fetch can be shorter to improve the processing performance of the processor.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A cache memory control device for a multi-processor system having a plurality of processors, comprising:

a plurality of cache memories provided in association with a plurality of said processors, respectively;

a memory device co-owned by a plurality of said cache memories having stored therein instruction data to be stored in each of said cache memories;

each of said cache memories storing therein instruction data pre-read from said memory device, said instruction data being used in each of said processors corresponding to each of said cache memories; and a plurality of command registers associated with said cache memories for controlling updating of said cache memories in association with respective ones of said plural cache memories;

each of said processors associated with each of said cache memories writing cache memory updating request commands, including information on time allowance until updating of said cache memories, in said command register associated with said cache memories, so that a cache memory updating request is output to a pre-fetch controller;

said pre-fetch controller including means for selecting a cache memory updating request, based on the time allowance information of a plurality of updating requests for said plural cache memories, if such plural updating requests for said cache memories are output;

said instruction data being read out from said memory device in accordance with the selected cache memory updating request to update contents of the so-selected cache memory.

2. The cache memory control device for the multi-processor system as defined in claim 1 wherein, if a plurality of said cache memory updating requests are output, said pre-fetch controller selects the cache memory updating request with the smallest time allowance.

3. The cache memory control device for the multi-processor system as defined in claim 1 wherein the value of said information on the time allowance output responsive to an updating request of said cache memory is decremented every preset time period until the cache memory updating request, during such request is issued, is accepted by said pre-fetch controller.

4. The cache memory control device for the multi-processor system as defined in claim 1 wherein a cache memory updating request command is set in said command register by said processor executing a preset software command, at the same time as said time allowance information is set in said command register, along with a readout start address of instruction data read out from said memory device by said software command executed in said processor;

said information pertinent to time allowance being output to said pre-fetch controller along with said cache memory updating request.

5. The cache memory control device for a multi-processor system as defined in claim 1 wherein
said cache memory includes a plurality of banks, and instruction data of one bank capacity read out from said memory device is rewritten from bank to bank.

6. The cache memory control device for a multi-processor system as defined in claim 1 wherein
on occurrence of mis-hit of said cache memory, a lower limit value of said information on the time allowance is output to said pre-fetch controller along with said cache memory updating request.

7. A cache memory control device for a multi-processor system having a plurality of processors, comprising:
a plurality of cache memories provided in association with a plurality of said processors, respectively;
a memory device co-owned by a plurality of said cache memories having stored therein instruction data to be stored in each of said cache memories;
each of said cache memories storing therein instruction data pre-read from said memory device, said instruction data being used in each of said processors corresponding to each of said cache memories; and
a plurality of command registers associated with said cache memories for controlling updating of said cache memories in association with respective ones of said plural cache memories;
each of the processors associated with each of said cache memories writing a cache memory updating request command, inclusive of a readout start address of said memory device, in said command register associated with each said cache memory, to output a cache memory updating request to a pre-fetch controller;
said pre-fetch controller including means for broadcast-transferring to said plural cache memories a readout start address of said memory device output along with said cache memory updating request and instruction data read out from said memory device;
the contents of said cache memory being updated by the broadcast-transferred instruction data if said readout start address broadcast-transferred from said pre-fetch controller coincides with a readout address of said memory device updating an own cache memory;
a plurality of the cache memories being enabled to be updated simultaneously responsive to updating requests of plural cache memories the readout addresses of the memory device of which coincide with one another.

8. The cache memory control device for a multi-processor system as defined in claim 7 wherein
if a plurality of the cache memory updating requests are output and there are such ones of said cache memory updating requests having the coincident readout start addresses of said memory device, the instruction data read out from said memory device are broadcast to the plural cache memories along with the readout start address of said memory device.

9. The cache memory control device for a multi-processor system as defined in claim 7 wherein
in said cache memory in which said readout start address broadcast-transferred by said pre-fetch controller is coincident with the readout address of said memory device which has made an updating request to an own cache memory, the updating request of said cache memory output to said pre-fetch controller is inactivated, and the contents of said cache memory are updated by said broadcast-transferred instruction data.

10. The cache memory control device for a multi-processor system as defined in claim 7 wherein a cache memory updating request command including the information on time allowance until updating of said cache memory is written by said processor in said command register;
said pre-fetch controller including means for selecting an updating request for one cache memory based on said time allowance of said plural cache memory updating requests if such plural cache memory updating requests have been output, said pre-fetch controller reading out the instruction data from said memory device to update the contents of the selected cache memory.

11. The cache memory control device for a multi-processor system as defined in claim 7 wherein
said cache memory includes a plurality of banks, and instruction data of one bank capacity read out from said memory device is rewritten from bank to bank.

12. The cache memory control device for a multi-processor system as defined in claim 8 wherein
said cache memory includes a plurality of banks, and a plurality of said command registers are provided one for each of said cache memories.

13. The cache memory control device for a multi-processor system as defined in claim 7 wherein
on occurrence of mis-hit of said cache memory, a lower limit value of said information on the time allowance is output to said pre-fetch controller along with said cache memory updating request.

14. In a multi-processor system adapted for a plurality of channels or lines, and including a processor, a cache memory and a cache memory controller for each channel or line, a cache memory control device comprising:
a sole common memory device common through said cache memories, for storage of instruction data executed by each processor, and
means for exercising control so that, if pre-fetch requests are issued simultaneously from plural cache controllers, pre-fetch of said instruction data from said instruction memory device to said cache memory is performed beginning from a cache memory with the least time allowance, based on the information indicating the time allowance until a scheduled timing of actual use of the instruction data pre-fetched to said cache memory.

15. In a multi-processor system adapted for a plurality of channels or lines, and including a processor, a cache memory and a cache memory controller for each channel or line, a cache memory control device comprising:
a sole common memory device common through said cache memories, for storage of instruction data executed by each processor, and
means for broadcasting instruction data pre-fetched from said memory device to a plurality of said cache memory controllers which issued pre-fetch requests when there are a plurality of pre-fetch requests having coincident pre-fetch start addresses of said memory device specified by said pre-fetch requests from said cache controllers.

16. A multi-processor system having a processor, a cache memory and a cache memory controller for each of physical layers of communication control, and adapted for a plurality of channels or lines, wherein an instruction memory device for storage of instruction data forming a program loaded in a cache memory of each processor of a plurality of said physical layers is co-owned by a plurality of said physical layers;

in a pre-fetch control device for pre-fetching instruction data from said instruction memory device, plural interfaces for controlling the accessing to said instruction memory device are collected into a sole interface;

in issuing a pre-fetch request of instruction data, the cache memory control device of each physical layer also outputting to said pre-fetch control device an information pertinent to the time allowance until said instruction data are needed by said cache memory associated with said cache memory control device;

said pre-fetch control device including means for selecting a pre-fetch request with a smaller one of the time allowance if pre-fetch requests are output simultaneously from the plural cache memory control devices.

17. The multi-processor system as defined in claim 16 wherein the time allowance information from said cache memory control device is decremented every preset time period until the pre-fetch request is accepted.

18. The multi-processor system as defined in claim 16 wherein said cache memory is made up of instruction RAMs having a plurality of banks, and instruction data in a volume of said bank read out from said instruction memory device is rewritten from one bank to another.

19. The multi-processor system as defined in claim 18, wherein the cache memory control devices of said physical layers are each made up of an instruction RAM controller controlling said instruction RAM;

said instruction RAM controller including a command register, in which a start address of said instruction memory device pre-fetched by said pre-fetch request command from said processor, the bank number of the instruction RAM in which the pre-fetched instruction data is loaded, and the information on time allowance, i.e., deadline time, are set, said time allowance as set on said command register being output to said pre-fetch control device along with said pre-fetch request signal and said start address; and wherein if pre-fetch requests from plural physical layers are output simultaneously, said pre-fetch control device selects a pre-fetch request with the least time allowance.

20. The multi-processor system as defined in claim 19 wherein said pre-fetch control device broadcasts the start address of instruction data and pre-fetched instruction data of said instruction storage device to said instruction RAM controllers of said plural physical layers, and if the start address of the instruction data pre-fetched and broadcast coincides with the start address requested to be loaded in the own cache memory, said pre-fetch control device exercises control to write the broadcast-transferred instruction data in said cache memory.

21. The multi-processor system as defined in claim 20 wherein said instruction RAM controller of each physical layer includes a plurality of command registers, and if the pre-fetch command from said processor is set in said plural command registers, a pre-fetch request is issued to said pre-fetch control device.

22. The multi-processor system as defined in claim 19 wherein on occurrence of a mis-hit in said instruction RAM, a lower limit value of said information on time allowance is output from said instruction RAM controller to said pre-fetch control device.

23. A multi-processor system comprising an integrated circuit device composed of a plurality of multi-processor systems as defined in claim 16.

24. The multi-processor system as defined in claim 23 wherein said instruction memory device comprises a read-only memory device connected to said semiconductor integrated circuit device.

25. A communication control device of a multi-processor configuration comprising, for each of a plurality of physical layers of communication control, a communication-based circuit, a processor for controlling the communication-based circuit, an instruction random access memory RAM for pre-fetching and storing instruction data fetched by said processor and an instruction RAM controller for controlling said instruction RAM, said communication control device comprising:

a common one instruction ROM for storing said instruction data for said plural physical layers; and one pre-fetch controller for said plural physical layers for controlling pre-fetch from said instruction ROM;

said instruction RAM controller of each physical layer outputting an information pertinent to time allowance for a pre-fetch request for said instruction data;

wherein if a plurality of said pre-fetch requests are issued simultaneously from each of said instruction RAM controllers, said pre-fetch controller selects a pre-fetch request having the least time allowance.

26. A communication control device of a multi-processor configuration comprising, for each of a plurality of physical layers of communication control, a communication-oriented circuit, a processor for controlling the communication-oriented circuit, an instruction random access memory RAM for pre-fetching and storing instruction data fetched by said processor and an instruction RAM controller for controlling said instruction RAM, said communication control device comprising:

a common one instruction ROM for storing said instruction data for said plural physical layers; and one pre-fetch controller for said plural physical layers for controlling pre-fetch from said instruction ROM;

said instruction RAM controller of each physical layer outputting a pre-fetch start address to a pre-fetch request for said instruction data;

said pre-fetch controller operating, responsive to said pre-fetch request, for broadcast-transferring a pre-fetch start address for said instruction ROM and instruction data pre-fetched by said pre-fetch controller from said instruction ROM to said plural instruction RAM controllers.

27. A semiconductor integrated circuit device of a multi-processor configuration capable of coping with a plurality of lines, and which includes, for each of a plurality of physical layers of communication control, a communication-oriented circuit, a processor for controlling the communication-oriented circuit, an instruction random-access memory RAM operating as a cache memory for said processor and an instruction RAM controller for controlling said instruction RAM, said semiconductor integrated circuit device comprising:

an external instruction storage device for the semiconductor integrated circuit device, in which are stored instruction data to be loaded in each instruction RAM in each of said physical layers;

said instruction RAM being of a plural bank configuration in which, when one bank is being rewritten, said processor is able to access another bank, with said instruction data being rewritten in each bank in an amount corresponding to a volume of the bank read out from said instruction storage device;

said instruction RAM controller of each physical layer having a pre-fetch command register accessed by said processor;

there being set in said command register a start address of said instruction memory device to be pre-fetched, a bank number of the instruction RAM in which the pre-fetched instruction data is loaded and an information pertinent to time allowance, i.e., deadline time until the instruction data is used, subject to a pre-fetch request command from said processor;

the information pertinent to time allowance as set in said command register being output to a pre-fetch controller along with a pre-fetch request signal and said start address;

there being provided a common one of said pre-fetch controller for a plurality of said instruction RAM controllers of said physical layers, said pre-fetch controller being provided with an interfacing unit for said instruction memory device;

said pre-fetch controller including means for selecting a pre-fetch request with the least time allowance when a plurality of pre-fetch requests from the instruction RAM controllers of said physical layers are being output simultaneously;

the instruction data of a specified bank of said instruction RAM being updated responsive to said selected pre-fetch request.

28. A semiconductor integrated circuit device of a multiprocessor configuration coping with a plurality of lines, and which includes, for each of a plurality of physical layers, termed PHYs, of communication control, a communication-associated circuit, a processor for controlling the communication-associated circuit, an instruction random-access memory RAM operating as a cache memory for said processor and an instruction RAM controller for controlling said instruction RAM, said semiconductor integrated circuit device comprising:

an external instruction storage device for the semiconductor integrated circuit device, in which are stored instruction data to be loaded in each instruction RAM in each of said PHYs;

said instruction RAM being of a plural bank configuration in which, when one bank is being rewritten, said processor is able to access another bank, with said instruction data being rewritten in each bank in an amount corresponding to a volume of the bank read out from said instruction storage device;

said instruction RAM controller of each PHY having a pre-fetch command register accessed by said processor;

there being set in said command register a start address of said instruction memory device to be pre-fetched, and a bank number of the instruction RAM in which the pre-fetched instruction data is loaded;

there being provided a common one of said pre-fetch controller for a plurality of said instruction RAM controllers of said PHYs, said pre-fetch controller being provided with an interfacing unit for said instruction memory device;

said start address as set in said command register being output to said pre-fetch controller along with a pre-fetch request signal;

said pre-fetch controller including means for broadcasting said start address to instruction RAM controllers of a totality of PHYs, responsive to a pre-fetch request from said instruction RAM controller, said broadcasting means also broadcasting the instruction data read out from the instruction memory device to the instruction RAM controllers of the totality of PHYs;

said instruction RAM controllers of said PHYs including means for comparing whether or not the start address of the broadcast-transferred instruction data coincides with a start address as set in a command register of an own instruction RAM controller, said broadcast-transferred instruction data being written on coincidence of the broadcast-transferred instruction data in a specified bus of said instruction RAM.

* * * * *